(12) United States Patent
Schumann et al.

(10) Patent No.: US 12,524,951 B2
(45) Date of Patent: Jan. 13, 2026

(54) DIRECT VOLUME RENDERING APPARATUS USING SEGMENT LIGHTING VALUES

(71) Applicant: Fraunhofer-Gesellschaft Zur Forderung Der Angewandten Forschung Eingetragener Verein, Munich (DE)

(72) Inventors: Christian Schumann, Bremen (DE); Valentin Kraft, Bremen (DE); Florian Link, Bremen (DE)

(73) Assignee: FRAUNHOFER-GESELLSCHAFT ZUR FÖRDERUNG DER ANGEWANDTEN FORSCHUNG E. V., Munich (DE)

( * ) Notice: Subject to any disclaimer, the term of this patent is extended or adjusted under 35 U.S.C. 154(b) by 139 days.

(21) Appl. No.: 18/016,121

(22) PCT Filed: Jul. 15, 2021

(86) PCT No.: PCT/EP2021/069732
§ 371 (c)(1),
(2) Date: Jan. 13, 2023

(87) PCT Pub. No.: WO2022/013342
PCT Pub. Date: Jan. 20, 2022

(65) Prior Publication Data
US 2023/0274493 A1 Aug. 31, 2023

(30) Foreign Application Priority Data
Jul. 16, 2020 (EP) .................................. 20186257

(51) Int. Cl.
*G06T 15/08* (2011.01)
*G06T 15/06* (2011.01)
*G06T 15/50* (2011.01)

(52) U.S. Cl.
CPC .............. *G06T 15/08* (2013.01); *G06T 15/06* (2013.01); *G06T 15/50* (2013.01); *G06T 15/506* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 2015/0187118 A1* | 7/2015 | Masumoto | G06T 15/08 345/419 |
| 2018/0260996 A1* | 9/2018 | Schneider | G06T 15/08 |
| 2019/0371049 A1* | 12/2019 | Hsieh | G06T 15/60 |

FOREIGN PATENT DOCUMENTS

| | | |
|---|---|---|
| JP | 2009506417 A | 2/2009 |
| WO | 2007023459 A2 | 1/2007 |

OTHER PUBLICATIONS

Fung, et al., "Efficient Volume Rendering by IsoRegion Leaping Acceleration," The Sixth International Conference in Central Europe on Computer Graphics and Visualization, vol. 98, 1998.

(Continued)

*Primary Examiner* — Joni Hsu
(74) *Attorney, Agent, or Firm* — Ellen M. Bierman; Lowe Graham Jones PLLC

(57) ABSTRACT

The invention relates to a direct volume rendering apparatus for volume rendering a three-dimensional image data set. For each primary ray (10) of a plurality of primary rays, which traverse through the three-dimensional image data set and meet a respective pixel of a two-dimensional image in a two-dimensional image plane on which the three-dimensional image data set should be projected, colors and opacities are provided along the primary ray (10). Each primary ray (10) is subdivided into segments I, II, III, IV based on the opacities and/or colors along the respective primary ray (10), wherein, for each segment I, II, III, IV, a segment lighting (Continued)

Figure 1:
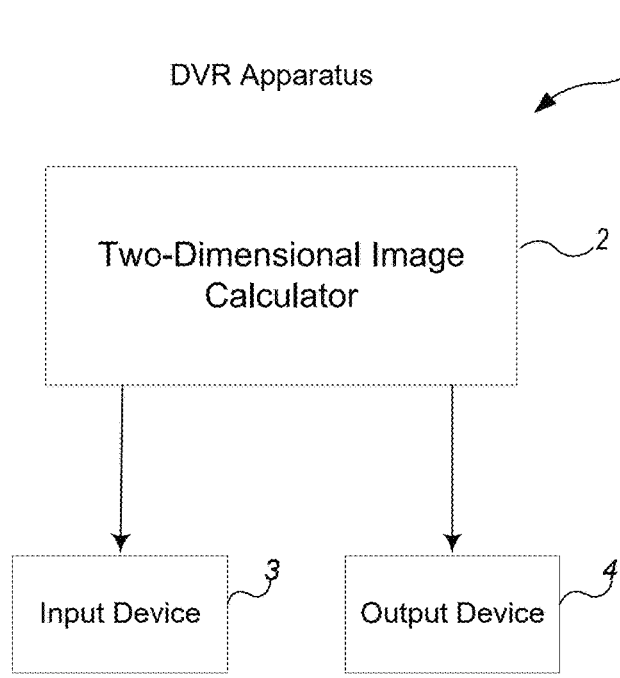

value in accordance with a predetermined lighting calculation rule is calculated. The colors and segment lighting values are finally projected along the primary rays (10) onto the pixels based on a predetermined projection rule.

14 Claims, 4 Drawing Sheets

(56) References Cited

OTHER PUBLICATIONS

Hernell, et al., "Interactive Global Light Propagation in Direct Volume Rendering using Local Piecewise Integration," IEEE/ EG Symposium on Volume and Point-Based Graphics 2008, The Eurographics Association, 2008, pp. 105-112.

Crassin, et al., "Interactive Indirect Illumination Using Voxel Cone Tracing," Computer Graphics Forum, The Eurographics Association and Blackwell Publishing, vol. 30, No. 7, 2011.

Favera, et al., "Ambient Occlusion Using Cone Tracing with Scene Voxelization," 2012 XXV SIBGRAPI Conference on Graphics, Patterns and Images, 2012, pp. 142-149.

Jonsson, et al., "Historygrams: Enabling Interactive Global Illumination in Direct Volume Rendering using Photon Mapping," IEEE Transactions on Visualization and Computer Graphics, vol. 18, No. 12, Dec. 2012, pp. 2364-2371.

Magnus, et al., "Interactive Dynamic Volume Illumination with Refraction and Caustics," IEEE Transactions on Visualization and Computer Graphics, vol. 24, Jan. 2018, pp. 984-993.

International Search Report, issued in International Application No. PCT/EP2021/069732 by International Bureau on Jan. 20, 2022.

Office Action, issued in Japanese Application No. 2023-502727 by the Japan Patent Office on Jul. 9, 2024.

* cited by examiner

DIRECT VOLUME RENDERING APPARATUS USING SEGMENT LIGHTING VALUES

CROSS-REFERENCE TO RELATED APPLICATIONS

This application claims priority to PCT Application No. PCT/EP2021/069732, titled "DIRECT VOLUME RENDERING APPARATUS," filed Jul. 15, 2021; which claims priority to European Application No. 20186257.0, filed Jul. 16, 2020; which applications are incorporated herein by reference in their entireties.

FIELD OF THE INVENTION

The invention relates to a direct volume rendering (DVR) apparatus, method and computer program for volume rendering a three-dimensional image data set, particularly a three-dimensional medical image data set.

BACKGROUND OF THE INVENTION

Modern computer graphics applications pose high requirements on the used hardware and rendering methods with respect to resolution, frame rates and image quality. For most applications, a frame rate of 25 frames per second (fps) poses the absolute minimum. The used image resolution is often 2K, i.e. 2048×1080 pixel, and above. Virtual Reality (VR) and Augmented Reality (AR) applications push the requirements even further. Here, frame rates of 60 fps and above are often mentioned as a minimum to create an immersive and comfortable user experience. Furthermore, the required frame rate is implicitly doubled due to the inherent stereo rendering of according headsets. While many headsets of recent years had relatively low resolutions, next generation headsets like the HoloLens 2 of the company Microsoft feature a native 2K resolution per eye. Hence, two 2K images have to be rendered at least at approximately 60 fps for a comfortable user experience on such headsets. At the same time, expectations regarding the image quality and realism are nowadays very high, pushed by the increasing speed of developments in a variety of industries, like for instance gaming, medicine or entertainment. Global Illumination is a key technique to generate realistic and compelling images, but is still usually not feasible in real-time. Real-time implementations typically rely on approximations such as Ambient Occlusion (AO) as, for instance, described in the article "An ambient light illumination model" by S. Zhukov et al., Rendering Techniques '98, pages 45 to 55 (1998), which is here incorporated by reference, or its many variations and can produce similar results.

The competing requirements of high frame rate, high resolution and high quality also concern the field of medical visualization. Here, in addition to classical surface rendering, DVR is used to give insights into the human body based on computed tomography (CT) and magnetic resonance (MR) images and is important for multiple medical applications, for instance pre-operative planning. Several studies showed that in addition to a pleasant appearance, a realistic depiction including important visual cues such as shadows improve spatial understanding and the ability to recognize anatomical structures, as also disclosed, for instance, in the articles "Depth discrimination from shading under diffuse lighting" by M. S. Langer et al., Perception 29(6), pages 649 to 660 (2000) and "About the influence of illumination models on image comprehension in direct volume rendering" by F. Lindemann et al., IEEE Transactions on Visualization and Computer Graphics 17(12), pages 1922 to 1931 (2011), which are herewith incorporated by reference. However, not all methods that allow to approximate global illumination (GI) in real-time can be directly applied to DVR. Furthermore, the computational efforts for DVR are in general higher than for surface rendering since any point in the visualized volume might contain valuable information whereas surface rendering only deals with discrete surfaces. As a result, even approaches that can be transferred to DVR are generally much slower than their surface rendering counterparts. Therefore, all methods for interactive computation of GI in DVR have to rely on some form of precomputation and storage of lighting values for each voxel of the visualized data set for reuse during interactive rendering. The limitation of such precomputed solutions is that an update of the precomputation is required each time the transfer function is updated or the volume is clipped. However, interactive clipping and definition of the transfer function is a requirement for many visualization scenarios. These standard operations are only partially possible with existing approaches and often suffer from lower frame rates.

SUMMARY OF THE INVENTION

It is hence an object of the present invention to provide a DVR apparatus, method and computer program for volume rendering a three-dimensional image data set with higher frame rates.

In a first aspect of the present invention a DVR apparatus for volume rendering a three-dimensional image data set is presented, wherein the DVR apparatus comprises a two-dimensional image calculator configured to calculate a two-dimensional image to be shown to a user by
  providing for each primary ray of a plurality of primary rays, which traverse through the three-dimensional image data set and meet a respective pixel of a two-dimensional image in a two-dimensional image plane on which the three-dimensional image data set should be projected, colors and opacities along the primary ray,
  subdividing each primary ray into segments based on the opacities and/or colors along the respective primary ray,
  calculating, for each segment, a segment lighting value in accordance with a predetermined lighting calculation rule,
  projecting the colors and segment lighting values along the primary rays onto the pixels based on a predetermined projection rule.

Thus, it is only required to calculate one lighting value per segment, thereby significantly reducing the computational efforts needed for calculating the two-dimensional image. Moreover, it has been found that by basing the subdivision of the primary rays on the opacities and/or colors along the respective primary ray it is possible to subdivide the primary rays such that a high image quality of the two-dimensional image can be achieved, even if only one lighting value is calculated per segment. A high quality volume rendering can therefore be provided with high frame rates. In particular, it is possible to provide a high quality volume rendering with approximated global illumination at frame rates that are high enough even for AR/VR applications without any restrictions regarding interactive transfer function definition and clipping.

The three-dimensional image data set could also be regarded as being a volumetric image data set, because it extends in three different spatial directions. The three-dimensional image data set can also be provided for different times, wherein in this case the image data set could also be regarded as being a four-dimensional data set.

The three-dimensional image data set comprises image elements being preferentially voxels. The two-dimensional image calculator is preferentially configured to provide for each primary ray colors and opacities along the respective primary ray by a) assigning to each image element of the three-dimensional image data set a color and an opacity, and b) calculating for each primary ray colors and opacities along the primary ray based on the colors and opacities assigned to image elements traversed by the primary ray. The assigning of the colors and the opacities to the image elements is preferentially defined by a transfer function (TF). Moreover, preferentially the DVR apparatus comprises an input receiving unit configured to allow a user to modify the TF, wherein the two-dimensional image calculator is configured to update the pixels of the two-dimensional image in response to the modification of the TF. Thus, if the TF is modified, the subdivision of each primary ray into segments based on the possibly modified opacities and/or colors, the calculation, for each segment, of a segment lighting value in accordance with a predetermined lighting calculation rule, and the projection of the colors and segment lighting values along the primary rays onto the pixels based on a predetermined projection rule is repeated, in response to the modification of the TF. This allows a user to modify the TF and to then monitor how the DVR visualization changes, particularly in real-time.

In an embodiment the opacities assigned to the image elements and the opacities calculated along the primary rays are represented by alpha values, wherein the alpha values refer to an alpha channel supplementing a color model like, for instance, an RGB color model, and thereby forming, for instance, an RGBA color model.

Furthermore, the two-dimensional image calculator can be configured to calculate the two-dimensional image for a part of the three-dimensional image data set, wherein this part is defined by at least one clipping plane, particularly by a set of clipping planes, wherein the direct volume rendering apparatus comprises an input receiving unit configured to allow a user to modify the at least one clipping plane, in particular the position and the orientation of the at least one clipping plane, wherein the two-dimensional image calculator is configured to update the pixels of the two-dimensional image in response to the modification of the at least one clipping plane. Hence, the two-dimensional image calculator can be configured to calculate the two-dimensional image such that it represents only the part of the three-dimensional image data set, which is not cropped, i.e. removed, by the at least one clipping plane. Correspondingly, the two-dimensional image calculator might be configured to at least perform the steps of subdividing each primary ray into segments, calculating, for each segment, a segment lighting value, and projecting the colors and segment lighting values along the primary rays onto the pixels only for the part of the three-dimensional image data set. Also at least one of the steps of assigning to each image element of the three-dimensional medical image a color and an opacity and defining primary rays through the three-dimensional image data set, wherein for each primary ray colors and opacities along the primary ray are calculated based on the colors and opacities assigned to image elements traversed by the primary ray, might be carried out for the defined part of the three-dimensional image data set only. Thus, if a clipping plane is modified, i.e. if the part to be imaged is modified, the pixels of the two-dimensional image are updated. This allows a user to modify a clipping plane and to then monitor how the DVR visualization changes, particularly in real-time.

Moreover, preferentially the two-dimensional image calculator can be configured such that the primary rays start at a position of a virtual camera, wherein the direct volume rendering apparatus comprises an input receiving unit configured to allow a user to modify the position and/or the orientation of the virtual camera, wherein the two-dimensional image calculator is configured to update the pixels of the two-dimensional image in response to the modification of the position and/or orientation of the virtual camera. Correspondingly, the two-dimensional image calculator might be configured to at least perform the steps of subdividing each primary ray into segments, calculating, for each segment, a segment lighting value, and projecting the colors and segment lighting values along the primary rays onto the pixels, if the position of the virtual camera has been changed. This allows a user to modify the position and/or the orientation of the virtual camera and to then monitor how the DVR visualization changes, particularly in real-time.

The input receiving unit can be a unit, which receives information from an input device, which is indicative of an input made by a user, or the input receiving unit can be the input device itself. The input device is, for instance, a keyboard, a computer mouse, a touchpad, a microphone, particularly of a headset, or another input device. The two-dimensional image is shown on an output unit like a monitor, displays of a headset, et cetera.

It is preferred that the three-dimensional image data set is a medical image data set. For instance, the three-dimensional image data set can be a CT image data set, an MR image data set, or an image data set of another imaging modality.

The two-dimensional image calculator can be configured to calculate two two-dimensional images based on the three-dimensional image data set in two different viewing directions, in order to allow for a stereo view. This allows the user to view the three-dimensional image data set in three dimensions, wherein the two two-dimensional images might be shown on two displays, each display being viewed by a respective eye, wherein the two displays might be displays of a headset.

The two-dimensional image calculator is configured to subdivide each primary ray based on the opacities and/or colors along the respective primary ray. This generally leads to segments which have different lengths. In other words, the two-dimensional image calculator is configured to subdivide each primary ray based on the opacities and/or such that not all segments have a same length. In particular, the two-dimensional image calculator is configured to subdivide each primary ray into segments by defining segment borders, wherein a segment border is defined by a position along a primary ray at which a function of the opacities and/or of the colors and/or of the accumulated opacities exceeds a predefined threshold value. The function of the opacities can be a function selected from the group consisting of, for example, the identity function, a linear function, an integrating function, i.e. an integral, a derivating function, i.e. a derivative, a tangent function and a square root function directly applied to the opacities and/or colors and/or applied to accumulated opacities. It has been found that by using these functions segments can be defined, which allow for high quality imaging of the three-dimensional image data set. In particular, these segments allow for a fast and good approximation of the illumination along the respective primary ray.

The two-dimensional image calculator is preferentially configured to provide several threshold values, wherein a segment border is defined by a position along a primary ray at which the function of the opacities and/or colors exceeds a predefined threshold value of the provided several threshold values. The difference between neighboring provided thresholds can be constant. The two-dimensional image calculator can be configured to provide the several threshold values in accordance with, for example, a predefined linear threshold function or a predefined exponential threshold function. For instance, if the maximal number of segments is $s_{max}$, the linear threshold function defining several thresholds t might be $$t = \frac{s}{s_{max}},$$

which also results in the equidistancy of the threshold values.

In a preferred embodiment the two-dimensional image calculator is configured to calculate, for each segment of each primary ray, a segment color and a segment opacity based on the colors and the opacities calculated along the respective primary ray in the respective segment. In particular, the segment color and the segment opacity can arise from the colors and opacities calculated along the respective primary ray in the respective segment by accumulation which corresponds to an integration. The integration could be achieved by using a Riemann sum with fixed sample distances leading to the accumulation of the samples along the ray. If the opacities calculated along the primary rays are represented by an alpha value, the segment opacity may refer to a segment alpha value and the accumulation may be given by alpha blending, which is also known as alpha compositing. Thus, when iterating over the samples of the three-dimensional image data during ray tracing along a ray segment, these samples may be mapped to a color and alpha value using, for instance, the TF, wherein the accumulation of these colors and alpha values along the ray segment may then be yielded by alpha blending which is a numerical approximation of the attenuation of light as it "travels" through the medium.

In a preferred embodiment the two-dimensional image calculator is configured to calculate, for each segment of each ray, a segment lighting value by defining a lighting value determination position within the respective segment and calculating, for, i.e. at, the respective lighting value determination position, the respective lighting value in accordance with the predetermined lighting calculation rule. Preferentially, the two-dimensional image calculator is configured to define the lighting value determination position within the respective segment such that it is within a quarter of the respective segment, which is arranged at the end of each segment with the primary ray being traced from the pixel position towards the volume, which preferentially corresponds to the quarter of the respective segment, which is arranged at the end of each segment with the primary ray being traced from a virtual camera position towards the volume. This lighting value determination position is hence preferentially at an end of the respective segment, which is directed away from the respective pixel. It has been found that by choosing the lighting value determination position within the respective segment in this way, the quality of the finally calculated two-dimensional image can be further improved.

In an embodiment the predetermined lighting value calculation rule includes at least one of a) calculating an ambient lighting value and b) calculating at least one directional lighting value. Preferentially, the predetermined lighting value calculation rule includes calculating, for the respective lighting value determination position, an ambient lighting value and at least one directional lighting value and calculating the segment lighting value by combining the ambient lighting value and the at least one directional lighting value. For instance, combining the ambient lighting value and the at least one directional lighting value can correspond to an addition. In particular, the predetermined lighting value calculation rule includes calculating a) the ambient lighting value by providing an environment map defining in which direction first incoming light has which intensity and by modifying the intensity of the first incoming light based on the opacities assigned to the image elements, and b) the at least one directional lighting value by providing directional lighting information for the lighting value determination position, which is indicative of the light intensity of second incoming light from a virtual light source, and by modifying the intensity of the second incoming light based on the opacities assigned to the image elements. In an embodiment the environment map can also indicate in which direction the first incoming light has which color.

In an embodiment the ambient lighting value is calculated by a) defining several cones within a hemisphere for the lighting value determination position, wherein the hemisphere is defined by a gradient of the colors and/or opacities assigned to the image elements at the lighting value determination position, wherein the hemisphere points in the direction of the gradient, wherein an end plane of the hemisphere traverses the lighting value determination position and is normal to the gradient, wherein the apices of the cones are located at the lighting value determination position, b) defining, for each cone, spheres centered on the axis of the respective cone, wherein the radii of the spheres increase with increasing distance to the respective apex, c) determining an occlusion value for each sphere and combining the occlusion values determined for all spheres of the respective cone, in order to determine an occlusion value for the entire respective cone, d) determining, for each cone, a modified light intensity based on the occlusion value determined for the respective cone and the light intensity of the first incoming light through the respective cone as defined by the environment map, and e) combining the modified light intensities determined for the cones of the respective lighting value determination position, in order to determine for the respective lighting value determination position an ambient lighting value. The combining of the modified light intensities determined for the cones of the respective lighting value determination position, in order to determine for the respective lighting value determination position an ambient lighting value, is preferentially a sum, weighted depending on the inclination of each cone to the respective gradient, of these modified light intensities.

In a preferred embodiment the environment map is adapted to the cones, i.e. it defines the intensity of the entire first incoming light within the respective cone. This further reduces the required computations, because per cone it is just required to modify the respective single light intensity value by using the single occlusion value determined for the respective cone.

The cones are preferentially evenly distributed within the respective hemisphere. In an embodiment, 5 or 6 cones are used in each hemisphere.

Preferentially, the spheres are defined such that the radius of a sphere is twice the radius of an immediately preceding sphere. Moreover, preferentially the radius of each sphere is equal to the distance of the sphere to the cone apex multiplied with the sine of half the cone opening angle. That way, the spheres are as big as possible while still fitting into the cone.

Preferentially, the occlusion value of a sphere is determined based on an opacity assigned to the center of the sphere according to volumetric data representing the original three-dimensional image data with a level of detail corresponding to the distance between the center of the sphere and the apex of the cone for which the sphere is defined. Preferentially, volumetric data representing the original three-dimensional image data are precomputed for each of a predefined number of levels of details and then stored. By determining the occlusion values of the spheres based on such volumetric data, the computational efforts needed for the occlusion value computations can be further reduced without substantially compromising the rendering quality.

An opacity assigned to a given image element of the volumetric data for a given level of detail may, for instance, correspond to a sum or an average of the opacities assigned to those image elements of the volumetric data for a next higher level of detail which correspond to the given image element, i.e. for instance, from which the given image element arises.

In a preferred embodiment the occlusion value of the sphere is modified based on a ratio of a distance between centers of spheres defined for the cone to an image element size, particularly a voxel size, in the original three-dimensional image data.

The occlusion values determined for the spheres can, for instance, be added to arrive at the occlusion value for the corresponding cone. The number of considered spheres can depend on the size of the data set or on a predefined maximal ray length in order to limit the size of the considered neighborhood. In any case, spheres may only be considered until the cone axis leaves the three-dimensional image data or penetrates a clipping plane.

As indicated above, based on the occlusion values determined for the different cones and the light intensity of the first incoming light through the respective cones as defined by the environment map, a modified light intensity may be determined for each cone. For instance, the modified light intensity determined for each cone can correspond to the product of the occlusion value determined for the respective cone and the light intensity of the first incoming light through the respective cone as defined by the environment map. As also indicated above, the modified light intensities determined for the cones corresponding to the respective lighting value determination position may be combined in order to determine an ambient lighting value for the respective lighting value determination position, wherein the combining of the modified light intensities determined for the cones of the respective lighting value determination position, in order to determine for the respective lighting value determination position an ambient lighting value, is preferentially a sum, weighted depending on the inclination of each cone to the respective gradient, of these modified light intensities. The weights may, in particular, be given by the cosine of the inclination of the respective cone to the respective gradient.

In a preferred embodiment the at least one direct lighting value is calculated by a) defining several cones within a hemisphere for the lighting value determination position, wherein the hemisphere is defined by a gradient of the colors and/or opacities assigned to the image elements at the lighting value determination position, wherein the hemisphere points in the direction of the gradient, wherein an end plane of the hemisphere traverses the lighting value determination position and is normal to the gradient, wherein the apices of the cones are located at the lighting value determination position, b) defining, for each cone, spheres centered on the axis of the respective cone, wherein the radii of the spheres increase with increasing distance to the respective apices, c) determining an occlusion value for each sphere and combining the occlusion values determined for all spheres of the respective cone, in order to determine an occlusion value for the entire cone, d) determining, for each cone, a directional light contribution indicative of a portion of the light intensity of the second incoming light from the virtual light source associated with the respective cone, and e) determining a modified light intensity based on the occlusion values and the directional light contributions determined for the several cones as the at least one directional lighting value. Preferably, the directional light contribution for a cone depends on the direction of the virtual light source as determined by the directional lighting information and the direction of the respective cone axis, particularly on an angle between the direction of the virtual light source as determined by the directional lighting information and the direction of the respective cone axis. For instance, the directional light contribution can be highest for the cone which includes the direction of the virtual light source, which is determined by the directional lighting information, and may decrease with increasing inclination of the respective cone axis to the direction of the virtual light source. The directional light contribution may further depend also on the opening angle of the respective cone, which can be the same for all cones. To avoid lighting discontinuities that may arise if, for instance, the virtual light source generating the second incoming light moves out of the solid angle covered by any single cone within the hemisphere into another cone, the contribution should be chosen such that a gradual transition between neighboring cones without any gaps or hard jumps is guaranteed. The modified light intensity and hence the at least one directional lighting value can be obtained by multiplying the light intensity of the second incoming light with a weighted sum over the occlusion values for the several cones, wherein the weights depend on the direction of the virtual light source as determined by the directional lighting information and the direction of the respective cone axis, particularly on the angle between the direction of the virtual light source as determined by the directional lighting information and the direction of the respective cone axis, and possibly further on the opening angle of the respective cone.

The two-dimensional image calculator can be further configured to calculate for each segment a segment color based on the colors and opacities along the respective segment and to project the colors and segment lighting values along the primary rays onto the pixels by projecting the segment colors and segment lighting values. The corresponding projection rule defines how a compositing of the colors and segment lighting values is carried out. For instance, the compositing of the colors and segment lighting values according to the projection rule may amount to summing illuminated segment colors over all segments, wherein the illuminated segment color for a segment (i.e. the final color value for the segment under consideration of the illumination) can be computed by multiplying the segment color with the respective segment lighting value. Since the segment colors are already known from the initial ray tracing and accumulation of colors and opacities along the segments of the primary ray using, for instance, alpha blending, the final projection step, i.e. performing the summation to obtain the final illuminated pixel value in the two-dimensional image, becomes very simple.

In another aspect of the present invention a DVR method for volume rendering a three-dimensional image data set is presented, wherein the direct volume rendering method comprises:

providing for each primary ray of a plurality of primary rays, which traverse through the three-dimensional image data set and meet a respective pixel of a two-dimensional image in a two-dimensional image plane on which the three-dimensional image data set should be projected, colors and opacities along the primary ray, subdividing each primary ray into segments based on the opacities and/or colors along the respective primary ray, calculating, for each segment, a segment lighting value in accordance with a predetermined lighting calculation rule, projecting the colors and segment lighting values along the primary rays onto the pixels based on a predetermined projection rule.

In a further aspect of the present invention a computer program for volume rendering a three-dimensional image data set is presented, wherein the computer program comprises program code means for causing a DVR apparatus as defined in any of claims 1 to 13 to carry out the steps of the DVR method as defined in claim 14, when the computer program is run on a computer controlling the DVR apparatus.

It shall be understood that the system of claim 1, the method of claim 14 and the computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE EMBODIMENTS

Figure 2:
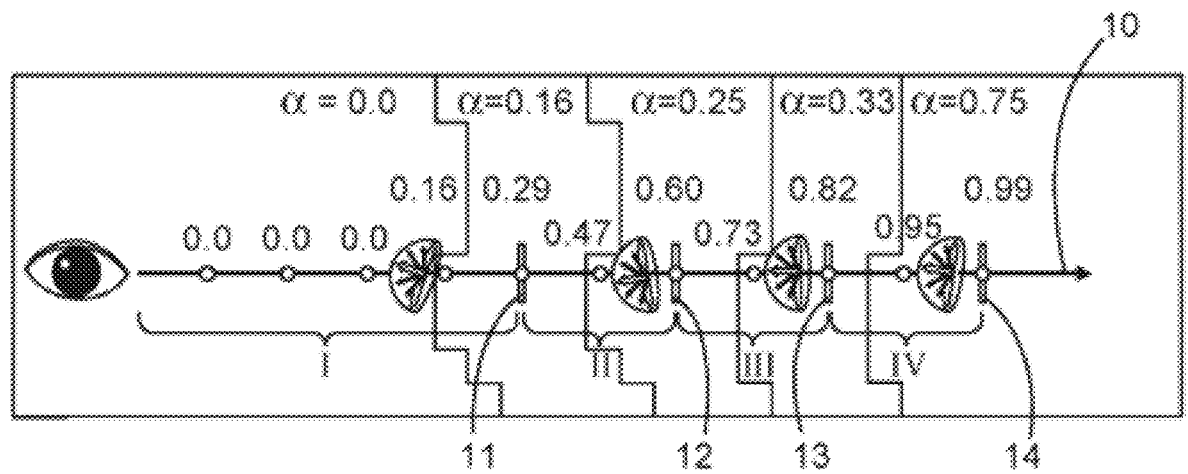
Figure 3:
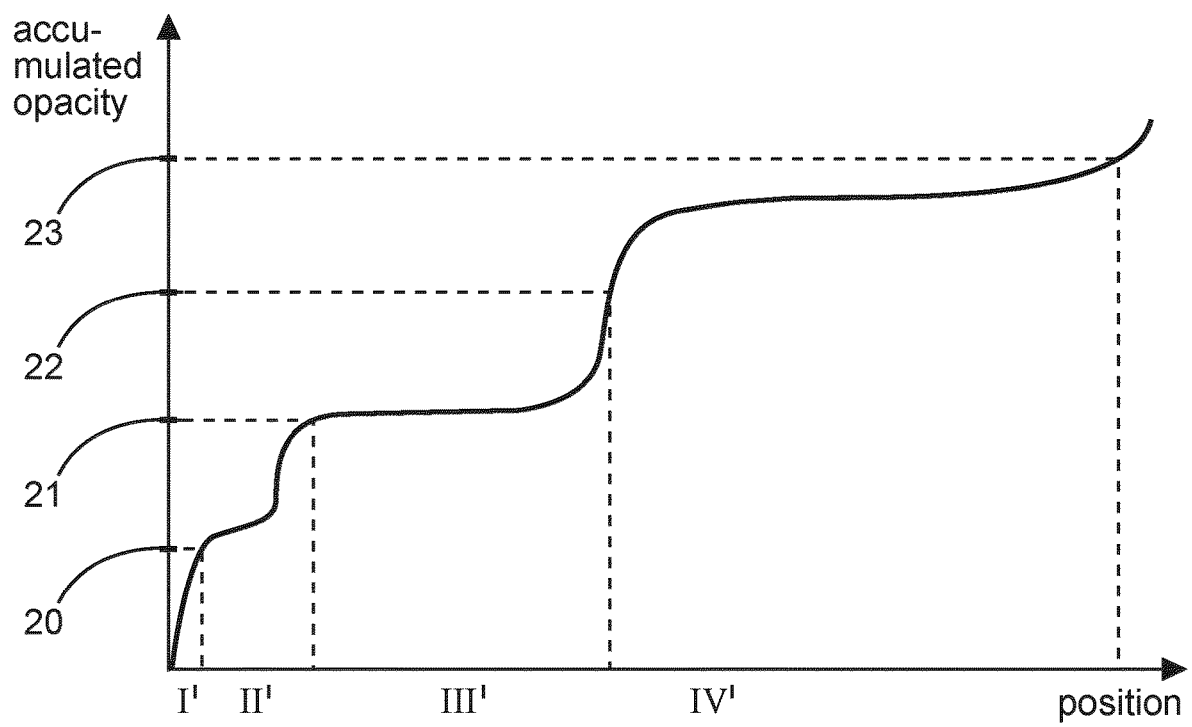
Figure 4:
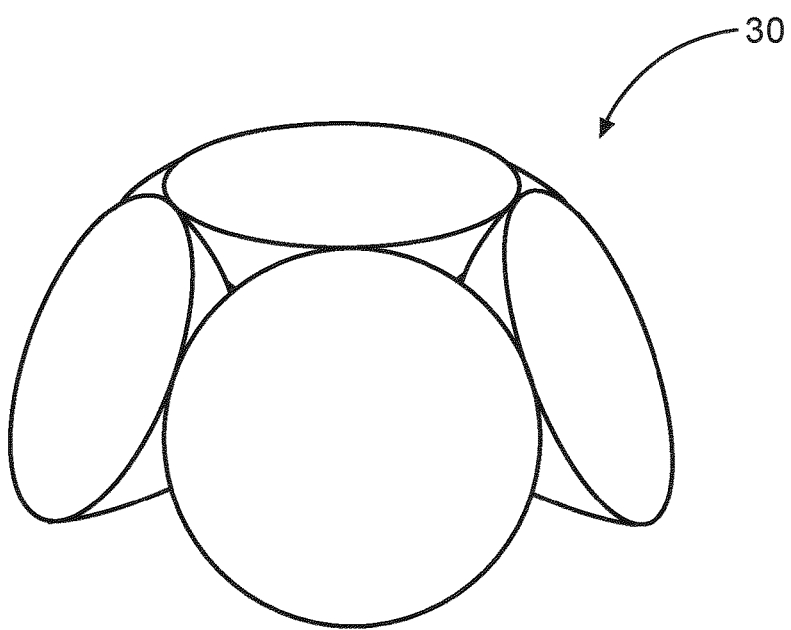
Figure 5:
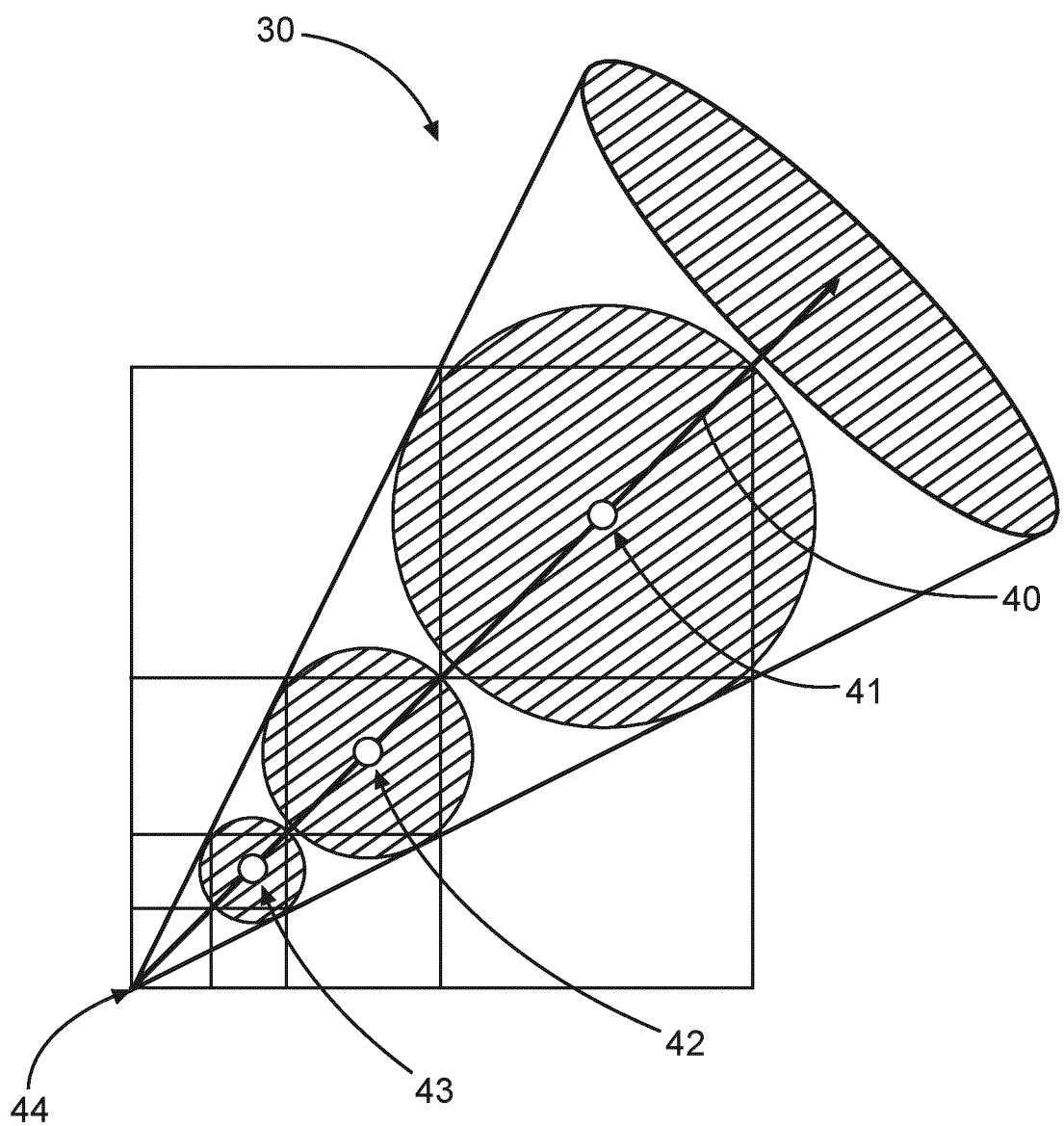
Figure 6:
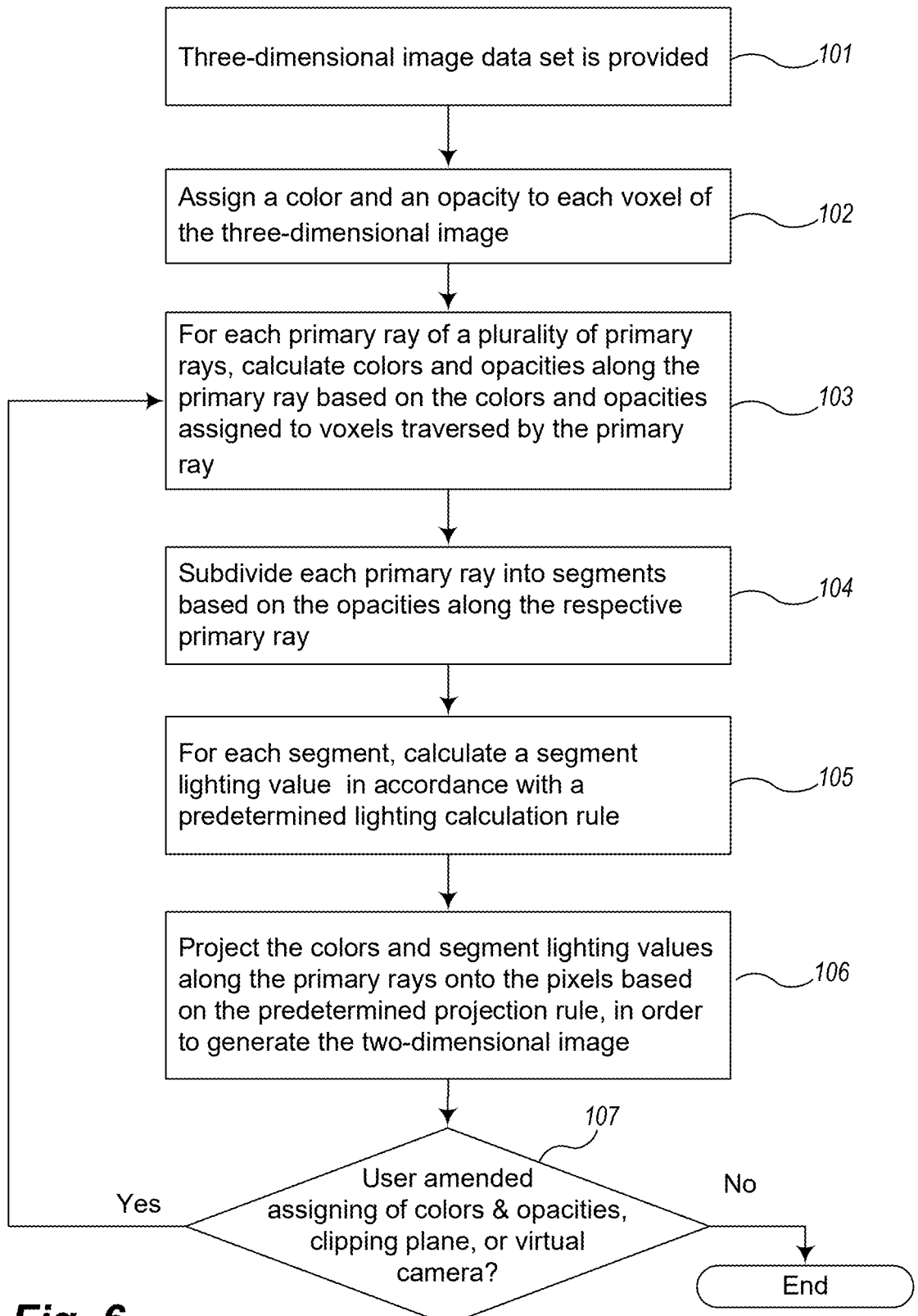

In the drawings:

FIG. 1 shows schematically and exemplarily an embodiment of a DVR apparatus,

FIG. 2 illustrates schematically and exemplarily a subdivision of a primary ray based on opacities along the primary ray, FIG. 3 illustrates schematically and exemplarily a subdivision of a primary ray based on opacity values by using equidistant thresholds, FIG. 4 illustrates schematically and exemplarily a subdivision of a hemisphere into six cones used for calculating a segment lighting value for a position within a segment of a primary ray, FIG. 5 illustrates schematically and exemplarily a sampling of a cone by means of a varying sampling density along a secondary ray, and FIG. 6 shows a flowchart exemplarily illustrating an embodiment of a DVR method.

DETAILED DESCRIPTION OF EMBODIMENTS

FIG. 1 shows schematically and exemplarily a DVR apparatus 1 for volume rendering a three-dimensional medical image data set. The DVR apparatus 1 comprises a two-dimensional image calculator 2 configured to calculate a two-dimensional image to be shown to a user.

The DVR apparatus 1 further comprises an input device 3 like a keyboard, a computer mouse, a touchpad, a microphone, particularly of a headset, or another input device. The two-dimensional image is shown on an output unit 4 like a monitor, displays of a headset, et cetera.

The two-dimensional image calculator 2 assigns to each voxel of the three-dimensional medical image a color and an opacity and defines primary rays through the three-dimensional image data set, which start at the position of a virtual camera and traverse through a respective pixel of a two-dimensional image in a two-dimensional image plane on which the three-dimensional medical image data set should be projected, wherein for each primary ray colors and opacities along the primary ray are calculated based on the colors and opacities assigned to voxels traversed by the primary ray.

Moreover, the two-dimensional image calculator 2 subdivides each primary ray into segments based on the opacities along the respective primary ray. In this embodiment the two-dimensional image calculator 2 is configured to subdivide each primary ray into segments by defining segment borders, wherein a segment border is defined by a position along a primary ray at which accumulated opacities exceed a respective predefined threshold value. Neighboring predefined threshold values preferentially have a constant distance and they might be defined, for instance, by $$t = \frac{s}{s_{max}},$$

wherein s is the counter for the respective segment and $s_{max}$ is the maximum number of segments, which can be predefined or automatically determined by the two-dimensional image calculator 2.

The accumulated opacity represents the attenuation of radiance that "travels" through the medium. For example, an accumulated opacity of 0.5 means that 50% of the radiance of a ray is being absorbed by the medium. It is based on the physical laws of light, wherein in volume rendering the physical basis for simulating the propagation of light in a volume was formulated, for instance, by the emission-absorption model in the article "Optical Models for Direct Volume Rendering" by N. Max, *IEEE Transactions on Visualization and Computer Graphics*, 1(2), pages 99 to 108 (1995), which is herewith incorporated by reference. Usually, the accumulated opacity is being calculated by a technique called alpha blending which is a numerical approximation of the physical laws formulated in the above mentioned article by N. Max. Preferentially, the accumulated opacity is calculated in accordance with the product in equation (4) below.

FIG. 2 schematically and exemplarily shows a primary ray 10 which has been subdivided into several segments of which four segments I, II, III, IV are shown, wherein at the borders 11, 12, 13, 14 the respective accumulated opacity exceeded a threshold value. It is noted, however, that the threshold 14 might not be met because an early ray termination might be applied, wherein the ray tracing is stopped after a certain predefined accumulated opacity value like 0.99 or 0.96 has been reached. In FIG. 2 α indicates the opacities of the volume for each colored area and the values along the primary ray 10 indicate the accumulated opacities.

FIG. 3 shows a further example for illustrating the subdivision of a primary ray. In this FIG. the horizontal axis indicates the position along the respective primary ray and the vertical axis indicates the accumulated opacity. Moreover, in this figure the lines 20 . . . 23 indicate equidistant thresholds. As can be seen in this figure, each time the accumulated opacity reaches one of the thresholds 20 . . . 23, a respective border of a respective segment I', II', III', IV' is defined. It should be noted that FIG. 2 and FIG. 3 are based on different opacity values, i.e. FIG. 3 does not correspond to the situation shown in FIG. 2.

The two-dimensional image calculator 2 is further configured to calculate, for each segment, a segment lighting value by defining a position within the respective segment and by calculating, for the respective position, the respective lighting value in accordance with the predetermined lighting calculation rule. Preferentially, the two-dimensional image calculator 2 is configured to define the position within the respective segment such that it is within a quarter of the respective segment, which is arranged at the end of each segment with the primary ray being traced from the virtual camera/pixel position towards the volume. In FIG. 2 this "quarter" is at the right side of the respective segment I, II, III, IV, wherein in this figure the respective position, at which the respective lighting value is calculated, is illustrated by hemispheres. In this example the respective position is at the respective end of the respective segment I, II, III, IV.

In this embodiment the predetermined lighting value calculation rule includes calculating, for the respective lighting value determination position, an ambient lighting value and several directional lighting values and calculating the segment lighting value by combining the ambient lighting value and the directional lighting values. In particular, the predetermined lighting value calculation rule includes calculating a) the ambient lighting value by providing an environment map defining in which direction first incoming light has which intensity and by modifying the intensity of the first incoming light based on the opacities assigned to the voxels, and b) the directional lighting values by providing directional lighting information for the lighting value determination position, which is indicative of the light intensity of second incoming light from virtual light sources, and by modifying the intensity of the second incoming light based on the opacities assigned to the voxels.

In this embodiment for each lighting value determination position a respective hemisphere is defined. The hemisphere is defined by a gradient of the opacities assigned to the voxels at the lighting value determination position, wherein the hemisphere points in the direction of the gradient, wherein an end plane of the hemisphere traverses the lighting value determination position and is normal to the gradient. Moreover, within each hemisphere several cones 30 are defined. The cones 30 are preferentially evenly distributed within the respective hemisphere. In this embodiment, 6 cones 30 are used in each hemisphere as illustrated in FIG. 4.

Moreover, for each cone 30, spheres centered on the axis 40 of the respective cone 30 are defined, wherein the radii of the spheres increase with increasing distance to the respective apex 44, as illustrated in FIG. 5. The axis 40 of the respective cone 30 could also be regarded as being a secondary ray.

An occlusion value is determined for each sphere and the occlusion values determined for all spheres of the respective cone 30 are combined, in order to determine an occlusion value for the entire respective cone 30. Furthermore, for each cone 30, a modified light intensity is determined based on the occlusion determined for the respective cone 30 and the light intensity of the first incoming light through the respective cone 30 as defined by the environment map, and the modified light intensities determined for the cones 30 of the respective lighting value determination position are combined, in order to determine for the respective lighting value determination position an ambient lighting value. The combining of the modified light intensities determined for the cones 30 of the respective lighting value determination position, in order to determine for the respective lighting value determination position an ambient lighting value, is preferentially a weighted sum of these modified light intensities, wherein each modified intensity is weighted depending on the inclination of each corresponding cone to the respective gradient. The weights may, in particular, be given by the cosine of the respective inclination.

In a preferred embodiment the environment map is adapted to the cones 30, i.e. it defines the intensity of the entire first incoming light within the respective cone 30. This reduces the required computations, because per cone 30 it is just required to modify the respective single light intensity value by using the single occlusion value determined for the respective cone 30.

The spheres are defined such that the radius of a sphere is twice the radius of an immediately preceding sphere. Moreover, the radius of each sphere is equal to the distance of the sphere to the cone apex multiplied with the sine of half the cone opening angle. That way, the spheres are as big as possible while still fitting into the cone.

The respective direct lighting value is calculated by determining a modified light intensity based on a) the occlusion determined for the cone 30 which includes the ray of the second incoming light from the respective virtual light source and b) the light intensity of the second incoming light through the cone 30 as defined by the directional lighting information. For instance, the modified light intensity and hence the respective directional lighting value is obtained by multiplying the determined occlusion with the light intensity of the second incoming light.

In particular, the modified light intensity and hence the at least one directional lighting value can be determined based on the occlusion values determined for all cones within the hemisphere by multiplying the light intensity of the second incoming light with a weighted sum over the occlusion values for all cones within the hemisphere, wherein the weights depend on the respective angle between the direction of the second incoming light and the respective cone axis as well as on the respective cone opening angle.

After for each segment, i.e. for each respective lighting value determination position, a respective segment lighting value has been determined, the two-dimensional image calculator projects the colors and segment lighting values along the primary rays onto the pixels based on a predetermined projection rule. In particular, the two-dimensional image calculator 2 is configured to calculate for each segment a segment color based on the colors and opacities along the respective segment and to project the colors and segment lighting values along the primary rays onto the pixels by projecting the segment colors and segment lighting values. The projection rule can be, for instance, multiplying each segment color with the respective segment lighting value and adding the resulting products. However, also other projection rules could be used.

The calculation of a respective segment lighting value includes, as explained above, a computation of an ambient occlusion (AO), i.e. the occlusion of incoming ambient light at the respective lighting value determination position by the voxels of the three-dimensional data set, which is used for determining the ambient lighting value. To compute AO for volumetric data, multiple AO samples per primary ray can be used in order to account for semi-transparent volume data, wherein in this embodiment the segment-based algorithm can comprise at least three basic steps: (i) a creation of a level of detail (LOD) occlusion volume, (ii) a gathering of segment information from the original volume data during an initial ray tracing and (iii) the illumination computation and final compositing, i.e. projecting. In the next paragraphs steps of an embodiment will be explained based on the problems encountered during the development of the DVR apparatus.

The physical basis for simulating the propagation of light in a volume can be given, for instance, by an emission-absorption model like the emission-absorption model disclosed in the above mentioned article by N. Max. According to this article by Max and a further article "A survey of volumetric illumination techniques for interactive volume rendering" by D. Jönsson, *Computer Graphics Forum*, 33(1), page 27 to 51 (2014), which is also herewith incorporated by reference, the attenuated radiance from a point $\vec{x}_0$ along a ray $\vec{\omega}_0$ and reaching a point $\vec{x}$ is given by equation (1) (without considering emission):

$$L(\vec{x},\vec{\omega}_0) = L_0(\vec{x}_0,\vec{\omega}_0) * T(\vec{x}_0,\vec{x}) + \int_{x_0}^{x} \sigma_s(\vec{x}') * L_{ss}(\vec{x}',\vec{\omega}_0) * T(\vec{x}',\vec{x})d\vec{x}', \quad (1)$$

with $\vec{x}'$ representing samples along the ray $\vec{\omega}_0$, $L_0$ being the background energy entering the volume, $\sigma_s$ being the scattering coefficient and the absorption term being:

$$T(\vec{x}_i,\vec{x}_j) = e^{-\int_{\vec{x}_i}^{\vec{x}_j}\sigma_t(\vec{x}')d\vec{x}'}. \quad (2)$$

In equation (1) $L_{ss}$ is representing the radiance scattered into the direction $\vec{\omega}_0$, from all incoming directions $\vec{\omega}_i$ on the unit sphere for every sample position $\vec{x}'$ on the view ray with s being the material shading function and $L_i$ the incident radiance from all directions $\vec{\omega}_i$:

$$L_{ss}(\vec{x}',\vec{\omega}_0) = \int_{4\pi} s(\vec{x}',\vec{\omega}_i,\vec{\omega}_0) * L_i(\vec{x}',\omega_i)d\vec{\omega}_i. \quad (3)$$

In order to be efficient enough for real-time rendering, in DVR the integral in equation (1) is approximated by computing a Riemann sum for the primary ray and compositing these samples using alpha blending, which ends up in the discrete volume rendering equation:

$$C = \Sigma_{i=1}^{n} C_i \Pi_{j=1}^{i-1}(1-\alpha_j). \quad (4)$$

Here, the final pixel color C for a ray travelling through the volume is determined by alpha blending opacity values $\alpha_j$ from the preceding samples and multiplying them with the color values $C_i$ for all samples i along the ray. Usually, the local lighting is now being calculated for each step and multiplied with the sample color $C_i$. However, this is missing global lighting effects and scattering (represented by the $L_{ss}$ term), because the computation of these effects is still very costly since it again involves the evaluation of the incoming radiance over the whole unit sphere for every step along the ray. A common approximation is to only consider point lights or directional lights and compute simple Phong shading. This, of course, is still missing the occlusion of the nearby structures and global lighting effects, which is why it is wanted to approximate the local occlusion by the AO term and the incident light by a high dynamic range image (HDRI) environment map. With $L_i$ being the incoming radiance from all directions $\vec{\omega}_i$, $L_i$ can thus be represented by the radiance environment map $E:L_i(\vec{x}',\vec{\omega}_i) = E(\vec{\omega}_i)$. Moreover, in this embodiment only the upper hemisphere of the current point is $\vec{x}'$ considered, which is defined by the gradient $\vec{n}$. In particular, the gradient is calculated based on the opacity values of the neighboring voxels. The resulting vector is then defining a plane in the three-dimensional space, i.e. the plane is perpendicular to the gradient and traverses the point for which the calculation is currently carried out. The hemisphere is preferentially the half sphere on the side of the plane, which is in the direction of the gradient.

For $L_{ss}$, this then yields:

$$L_{ss}(\vec{x}') = \frac{1}{\pi}\int_{\Omega^+} V(\vec{x}',\vec{\omega}_i) * E(\vec{\omega}_i)d\vec{\omega}_i. \quad (5)$$

In this equation $E(\vec{\omega}_i)$ is the radiance value which is defined as the value of the radiance environment map at the position where the vector $\vec{\omega}_i$ meets the sphere for which the radiance values of the radiance environment map are defined. Moreover, $V(\vec{x}',\vec{\omega}_i)$ is the visibility function providing a value between 0 and 1, wherein the value increases with a decreasing occlusion in the direction of the vector $\vec{\omega}_i$. If an incoming ray along the direction $\vec{\omega}_i$ does not reach the position $\vec{x}'$ because of being occluded, the visibility function provides the value 0. If an incoming ray along the direction $\vec{\omega}_i$ is not occluded at all, the visibility function provides the value 1.

The radiance map (given as a 360°×180° HDRI panorama image) should deliver the incident radiance for a cone with only one necessary sampling operation. To this end, pre-convolved lighting is employed as described in the article "Bent Normals and Cones in Screen-Space" by O. Klehm et al., VMV 2011—Vision, Modeling and Visualization, pages 177 to 182 (2011) which is herewith incorporated by reference. The radiance map can therefore be computed from a "standard" environment map by applying a filtering/blurring, corresponding to the required cone radius (this filtering can be done with free third party software tools). If multiple cone radii should be supported, the radiance map could also contain multiple LOD levels with increasing filter size/blurring. The radiance map is then imported into the renderer/shader as a "CubeMap texture" and can be sampled by using standard GLSL instructions. The CubeMap is defined as an infinitely large sphere around the scene and yields the incident radiance value for the intersection point of a direction wt with this sphere.

With V being the visibility function for the current position $\vec{x}'$ and the incident light direction $\vec{\omega}_i$, and with the proposed lighting model, the full equation can be written as follows:

$$L(\vec{x}, \vec{\omega}_0) = \qquad (6)$$

$$E(\vec{\omega}_0) * T(\vec{x}_0, \vec{x}) + \int_{\vec{x}_0}^{\vec{x}} \sigma_s(\vec{x}') * T(\vec{x}', \vec{x}) * \frac{1}{\pi} \int_{\Omega^+} V(\vec{x}', \vec{\omega}_i) * E(\vec{\omega}_i) d\vec{\omega}_i d\vec{x}'.$$

However, in other embodiments also another lighting model can be used. In particular, the lighting model can easily be combined with or extended to more sophisticated models and also directional or points lights. In this regard it is also referred to the further description below.

Because a brute-force approach, where AO (or the $L_{ss}$ term) is computed for every step along each ray, is not feasible, the two-dimensional image calculator 2 is configured to perform a segment-based computation where every primary ray is splitted into multiple segments. Each of these segments contains the alpha-blended accumulated radiance for the corresponding part of the ray so that the final radiance can be easily fetched by simply adding the segments together. This is close to the idea of local piecewise integration disclosed in the article "Interactive global light propagation in direct volume rendering using local piecewise integration" by F. Hernell et al., SPBG'08 Proceedings of the Fifth Eurographics/IEEE VGTC Conference on Point-Based Graphics, pages 105 to 112 (2008), which is also herewith incorporated by reference. However, in this embodiment the subdivision is opacity-driven and carried out for the primary rays instead of the secondary rays.

The two-dimensional image calculator 2 is configured to subdivide each primary ray into segments based on accumulated opacities along the respective primary ray. That is, the lengths of the segments are dependent on the accumulated alpha value during the tracing of the primary ray and therefore of varying length. Preferentially, the two-dimensional image calculator 2 is configured to subdivide each primary ray into segments by defining segment borders, wherein the segment borders are defined by positions along a primary ray at which the accumulated opacities exceed predefined threshold values. The difference between neighboring predefined thresholds can be constant. Generally, they can be linearly distributed, but they can also be distributed in another way like exponentially distributed. The current segment is hence changed, whenever the next accumulated opacity threshold (which, in the easiest case, is simply $$= \frac{s}{s_{max}})$$

is reached with s being the current segment number and $s_{max}$ the maximum number of segments.

The maximum number of segments might be set by a user. However, preferentially the maximum number of segments is predefined or automatically determined by the DVR apparatus and not set by the user.

Whenever a segment is changed, the current position inside the volume $\vec{p}_s$, i.e. the lighting value determination position, and the current accumulated color $C_s$, given by equation (4), i.e. the respective position $\vec{p}_s$ and the respective segment color of the respective segment, are stored to later being able to compute the segment lighting value and to composite the final pixel value by adding together the attenuated segments as it will be explained further below with reference to equation (7). The decoupling of the initial ray marching and the segment lighting value calculation has the advantage that the ray marching, which usually is parallelized in thread groups that operate in lockstep, is not hindered by the segment lighting value calculation, since also the segments per ray can vary and therefore faster threads would have to wait for the slower ones. In fact, the maximum number of segments is only used when a ray reaches all defined opacity thresholds. AO is only computed once per segment which results in an inherent adaptivity for the ambient occlusion/lighting computation. The pixel color C for the current pixel of the two-dimensional image is thus given by splitting the discrete volume rendering equation (4) into s partial sums, corresponding to having s segments:

$$C = \Sigma_{s=1}^{S_{max}} C_s = \Sigma_{i=1}^{n1} C_i \Pi_{j=1}^{i-1}(1-\alpha_j) + \Sigma_{i=n_1+1}^{n2} C_i \Pi_{j=1}^{i-1}(1-\alpha_j) + \ldots (s \text{ times}). \qquad (7)$$

Being determined by the accumulated opacity enables the apparatus to identify areas, i.e. segments, which to some degree have similar opacities and place segment borders close to sudden increases of the (accumulated) opacity. Thereby and by placing the lighting value determination position at the border to the last quarter of each segment, well-defined surface-like structures receive a reasonable lighting approximation. But also for soft tissue, which is characterized by a slow and continuous increase in the accumulated opacity, this heuristic works well since these areas are quite homogeneous and a specific positioning of $\vec{p}_s$ is less important.

The segment-based lighting is based on the assumption that the illumination doesn't change too much inside a segment and can simply be reused for all points in the segment. Still, there are other ways that the segment lighting value can be used. In principle, an illumination value could be interpolated for each position inside the segment based on the segment lighting value of the current segment and the segment lighting values of the two neighboring segments. Common interpolation schemes such as nearest neighbor, linear or cubic interpolation could be used. The pragmatic approach of using the segment lighting value for all points in the segment resembles nearest neighbor interpolation. This preferable approach enables a straight forward implementation that creates very good results.

Since the Riemann sum of the primary ray has already been computed in equation (4) and the AO value and the lighting term are assumed to be constant for each segment, it is possible to multiply them with their corresponding segment color $C_s$ in a later compositing step to get the final illuminated pixel value. Hence, the segments are only relevant for the lighting calculations and do not change the primary ray tracing step. The final compositing equation, being a numerical approximation for equation (6), is given by following equation (8), where $L(\vec{p}_s)$ is the lighting for the current segment s, comprised of the ambient occlusion term ao and the incident light $L_i$:

$$C_{ill} = \Sigma_{s=1}^{S_{max}} C_s * L(\vec{p}_s) = \Sigma_{s=1}^{S_{max}} C_s * ao(\vec{p}_s) * L_i(\vec{p}_s). \qquad (8)$$

It is not necessary to alpha-blend the segments to get the final pixel value, because the alpha values per segment were already alpha-blended during the initial raytracing. The maximum number of segments is determined by the complexity of the underlying data, but usually it can be quite low in order to get a reasonable approximation of the occlusion. Typical values of this parameter are in the range of 5 to 30 segments. This mainly depends on the complexity of the underlying data and the TF. A value of 5 segments can yield good results already, while values above 30 usually do not improve the visual quality any further. It has been found that, for typically sized datasets with a resolution of 512×512× 512 voxels and a typical TF, a maximum segment count of 10 produces already good results that are close to the path-traced counterpart. Thus, in a preferred embodiment the maximum number of segments per ray is 10.

In this embodiment the two-dimensional image calculator 2 is adapted to use Voxel Cone Traced AO as the AO model. AO is defined as the mean accessibility of a point $\vec{p}$ with $V(\vec{p}, \vec{\omega})$ being the visibility function for a direction $\vec{\omega}$:

$$ao(\vec{p}) = \frac{1}{\pi} \int_\Omega V(\vec{p}, \vec{\omega}) * \cos(\omega) d\omega. \quad (9)$$

This term can be approximated by tracing additional rays, i.e. secondary rays over the hemisphere of the point $\vec{p}$ to determine the visibility for the direction. In surface rendering, the visibility function V therefore usually is binary because there are only two possibilities: either the ray intersects with other geometry or it does not (unless transparent surfaces are also considered). In the case of volume rendering, i.e. in the present case, this is reformulated to adapt for a continuous visibility function: Here, the visibility is continuous and given by $1-\alpha_{acc}$ of the secondary ray, which underlies an emission-absorption model like the one disclosed in the above mentioned article by Max et al. The AO term for a segment, approximated with K secondary rays over the hemisphere of the point $\vec{p}_s$ can therefore be described by equation (10):

$$ao(\vec{p}_s) = \frac{1}{K} \Sigma_{k=1}^{K} (1 - \alpha_{acc}(\vec{\omega}_k)) * \cos(\vec{\omega}_k). \quad (10)$$

Due to the fact that AO is evaluated at multiple locations along each ray, this quickly results in quite high amounts of required secondary rays that have to be traced through the volume. Because the performance penalty for this secondary ray tracing is severe due to the frequent memory accesses, in this embodiment another scheme is used that reduces the number of required samples. Additionally, given the fact that indirect light and AO is very low-frequent, it has been found that it is not necessarily required to use the highest resolution of the volume for computing the occlusion. In fact, the farer away we are from the initial sample position, the broader the representation of the volume can be. The two-dimensional image calculator 2 is therefore adapted to create an additional occlusion volume that contains an exact copy of our main volume in multiple resolutions. Preferentially, the multi-resolution volume is recomputed once the TF is changed to account for fully dynamic changes of the TF. Since the down sampling of the volumes can be performed very efficiently on a graphics processing unit (GPU) of the two-dimensional image calculator 2, this adds only a small performance penalty. Thus, the sampling of the environment of each initial sample position can be designed as an LOD method, which accelerates the tracing of the secondary rays significantly. This is illustrated, as already mentioned above, in FIG. 5, wherein a secondary ray 40 in the center of the cone 30 is sampled at sample positions 41, 42, 43 with a spatial density which decreases with increasing distance to the respective position 44 which corresponds to the position $\vec{p}_s$.

The two-dimensional image calculator 2 is configured to compute AO in a manner which is similar to the manner disclosed in the article "Interactive indirect illumination using voxel cone tracing" by C. Crassin et al., Computer Graphics Forum 30(7), pages 1921 to 1930 (2011) which is herewith incorporated by reference. However, in contrast to the method described in this article, the two-dimensional image calculator 2 does not need to voxelize the scene, since the volume data is already voxelized. Additionally, the two-dimensional image calculator 2 does also not use a hierarchical data structure like an octree for lighting calculations, since neighbor information per voxel is not needed, which significantly reduces the complexity of the algorithm. Furthermore, in the present invention preferentially the Voxel Cone Tracing technique is applied to compute occlusion and not indirect lighting, in contrast to the original approach from Crassin. Still, the two-dimensional image calculator 2 inhibits the positive aspects of the approach, mainly being the absence of noise and a remarkable improvement in performance.

Similar to the technique disclosed in the article "Ambient occlusion using cone tracing with scene voxelization" by E. C. D. Favera et al., 25th SIBGRAPI Conference on Graphics, Patterns and Images, pages 142 to 149 (2012), which is herewith incorporated by reference, the two-dimensional image calculator 2 is configured to preferentially use six cones with an equal aperture per cone of 67 degrees for the gathering of the occlusion since there is no specular/high-frequent information and the layout with six cones 30 introduces smaller gaps than the original five cone layout proposed in the above mentioned article by Crassin et al. The cones are schematically and exemplarily shown in FIG. 4. It has been found that layouts with three cones or only one cone are not significantly improving the performance and produce visually worse results, which is why the two-dimensional image calculator 2 preferentially uses six cones. However, also another number of cones and different cone aperture angles can be used.

To now compute an occlusion value per cone, the two-dimensional image calculator 2 traces the corresponding secondary ray through the volume and approximates the cone integral. To this end, the multi-resolution occlusion volume is employed by summing up the occlusion values from the corresponding LOD levels along the cone in order to obtain the final approximated occlusion. The step size is therefore defined in such way that the extent of a cell of the current LOD level fits the diameter of the cone. Conceptually, this can be thought of as packing spheres into the cone, where for each new sphere the radius doubles, since the size of each cell in the multi-resolution volume doubles from each LOD level to the next one (cf. FIG. 5). This then yields formula (11) for computing the current distance $d_j$ from the starting point of the cone with the cone aperture $\theta$ for each LOD level j, given in voxels:

$$d_j = \frac{2^j}{\sin\frac{\theta}{2}}. \quad (11)$$

This results in an exponential growth of the step length which enables the two-dimensional image calculator 2 to sample a large neighborhood around each point with very few required samples and to simulate not only local AO but both large-scale occlusion effects as well as sharp details close to the current point. To adapt for the larger step size d', the opacity of each sample i is adjusted by a corrected term with d being the standard step size. In this regard reference is made also to the above mentioned article by Crassin et al.:

$$\alpha'_i = 1 - (1 - \alpha_i)^{\frac{d'}{d}}. \quad (12)$$

The two-dimensional image calculator 2 is configured to carry out an interpolation such that, in this embodiment, each position in the volume is sampled trilinearly, which ensures smooth interpolation results. In other embodiments the interpolation can of course also be carried out in another way.

The two-dimensional image calculator 2 can be configured to employ HDRI environment maps to illuminate a scene, i.e. to calculate lighting values by using HDRI environment maps. This has the advantage that the generated two-dimensional images to be displayed can be used in an AR scenario, because the HDRI environment maps can produce very natural and realistic lighting. As described above, the two-dimensional image calculator 2 is configured to use simplified lighting calculations by computing the lighting and the occlusion only once per segment. The two-dimensional image calculator 2 can use the already computed occlusion values for each cone to compute a directional lighting approximation by evaluating the incident light for each cone and then attenuate it with the corresponding occlusion value. This requires only very few additional texture lookups into the environment map yet yields a reasonable approximation of the incident light for the current segment.

To now compute the incident light per cone, the two-dimensional image calculator 2 could be configured to actually again integrate over the solid angle of each cone, e.g. by sampling the environment map multiple times. However, preferentially the two-dimensional image calculator 2 is configured to avoid this by using pre-convolved lighting as described in the above mentioned article by Klehm. To this end, mipmapped HDRI maps where each mipmap effectively serves as a representation of the pre-integrated incident light with the highest mipmap representing the radiance for a cone radius of preferentially 90 degrees can be used. With this, the incident light per cone is fetched by sampling the environment map once for the mipmap level that corresponds to the cone radius. Note, that if only one fixed cone opening (aperture) angle is used, precomputation of one map level is sufficient.

For a layout with K cones, the lighting, i.e. the lighting value, per point $\vec{p}_s$, i.e. per lighting determination position, and thus per segment in which the point $\vec{p}_{is}$ is present is therefore given by the following equation:

$$L(\vec{p}_s) = \frac{1}{K}\sum_{k=1}^{K}\left(1 - \alpha_{acc}(\vec{\omega}_k)\right) * \cos(\vec{\omega}_k) * L_{i_k}, \quad (13)$$

with $L_{i_k}$ being the incident light for the current cone K. With an environment map being the only light source, $L_{i_k}$ is defined by the light from the environment in the direction $\vec{\omega}_k$ of the secondary ray and the cone aperture $\gamma_k$ that corresponds to the according mipmap level of the environment map:

$$L_{i_k} = E(\vec{\omega}_k, \vec{\gamma}_k). \quad (14)$$

Thus, for instance, for a fixed cone aperture $\gamma_k$ that is the same for all cones, $L_{i_k}$ effectively only depends on $\vec{\omega}_k$.

In a similar fashion, this can be extended to also approximate directional lighting values such as the incident light from light sources such as directional lights (incoming light has parallel rays) or point lights (light coming from a point, incoming light rays are not parallel) and the respective shadows with very little additional computational effort. To this end, the shadow value for each light source is approximated as an interpolation of the occlusion values of the cones, which have already been computed (cf. eq. (13)). For incoming light from the direction $\vec{l}$, the incident light per cone K (without shadows) can be computed by:

$$L_{i_k} = \vec{l} \cdot \vec{\omega}_k * \xi(\vec{l}, \vec{\omega}_k) * L_d. \quad (15)$$

Here, $\xi$ is a smoothing function that avoids hard transitions at the cone borders and $L_d$ is the intensity of the light source. For both, directional lights and point lights, the direction of the incoming light $\vec{l}$ for the lighting value determination position $\vec{p}_s$ is clearly defined. In the case of directional light $\vec{l}$ is a property of the light source. For a point light, $\vec{l}$ is given by the vector from $\vec{p}_s$ to the position of the light source. Both $\vec{l}$ and $\vec{\omega}$ are unit vectors with magnitude one. Thus, in an embodiment the two-dimensional image calculator 2 is configured to calculate the lighting values in accordance with this equation.

$$C_{ill} = \sum_{s=1}^{S_{max}} C_s * ao(\vec{p}_s) * L_i(\vec{p}_s) = \quad (16)$$

$$\sum_{s=1}^{S_{max}} C_s * \frac{1}{K}\sum_{k=1}^{K}\left(1 - \alpha_{acc}(\vec{\omega}_k)\right) * \cos(\vec{\omega}_k) * L_{i_k}.$$

Since the contribution of each light source with every cone is calculated, a realistic lighting approximation with soft shadows is provided, without introducing noise and with very little additional computations. In fact, since the dot product can be evaluated very fast on the GPU and the accumulated alpha is already computed, this approach allows for an almost arbitrary number of light sources, while still computing soft shadows for each of it. This method might also be extended to incorporate other types of light sources such as area lights (i.e. lights with a rectangular or circular emitter) or lights of arbitrary shape, for example by treating points on the emitting area similar to point lights. An alternative approach could approximate the incoming light of such light sources also as cones (defined by $\vec{p}_s$ and $\vec{l}$ and an opening angle derived from the size of the light source and the distance to the light source), called incoming light cones, and modulate the occlusion values of the cone tracing cones with these incoming light cones based on the intersection of these two types of cones.

In order to further improve the two-dimensional image calculator 2, several optimizations are conceivable. The arguably most crucial part of the algorithm is the definition of the segment borders since they determine the positions along the ray, where the lighting and AO will be calculated. This comes down to an analysis of the progress of the accumulated opacity along a ray. As stated before, it is wanted to preferably set the segment borders before sudden increases of the accumulated opacity to optimally capture hard structures and borders. For uniform areas, however, it is wanted to distribute the segment borders as rarely as possible. Although a linear division of the segment borders already produces good results, a segment positioning based on a derivative of the accumulated opacity, which, in fact, correspond to the current opacity, might yield even better results. The two-dimensional image calculator can therefore be configured to subdivide each primary ray into segments based on the derivative of the accumulated opacity. The two-dimensional image calculator can be configured to use arbitrary functions that determine the segment borders. Moreover, the two-dimensional image calculator can be configured to define the segment borders not during, but after the initial ray tracing, when the complete progress of the accumulated opacity is known. In general, the better the segment borders are chosen, the higher is the convergence of the algorithm to the correct solution.

Additionally, the performance can be further improved by introducing more adaptivity-based ideas. Based on the observation that areas with low opacity contribute less to the final pixel result than areas with high opacity and high opacity often mark solid structures, the two-dimensional image calculator can be configured to use a sampling density that depends on the current opacity of a point. Thus, the two-dimensional image calculator can be configured to use a sampling for the AO calculation, where areas with low opacity are sampled less exactly than areas with high opacity. The two-dimensional image calculator can be configured to use different cone sample patterns for this, i.e., for instance, three cones for low accuracy, six for higher accuracy. The directional light and environmental light approximations/calculations can be used with arbitrary cone layouts and apertures.

The two-dimensional image calculator can be produced by, for instance, implementing the above described technique in the GLSL fragment shader of a common ray-casting-based Direct Volume Renderer in a rasterization graphics API like OpenGL hence utilizing the computational power of the graphics processing unit (GPU). The ray-casting-based Direct Volume Renderer can be, for example, the "Giga Voxel volume renderer" in the well-known "MeVis-Lab" software for medical visualization. However, the described performance improvements based on the introduced segment-based adaptive illumination sampling are also achievable in any other CPU-based, GPU-rasterization-based or GPGPU (general purpose GPU)-based (for example using CUDA) Volume Renderer implementation.

As described above, the two-dimensional image calculator uses segment-based rendering to greatly reduce the required lighting calculations preferentially by identifying similar regions in the underlying data and assuming constant lighting values for these areas. This results in a significant reduction of required lighting calculations and a varying number of calculations per ray. The inventors further found that in the case of rasterization-based implementations the performance can be further improved when the lighting calculations, which comprise AO and evaluation of the incident light, are decoupled from the initial ray tracing. This is caused by the fact that the fragment shader thread groups operate in lockstep and faster threads have to wait for slower threads. Due to the fact that the position along the ray, where the lighting is calculated, can differ significantly even for adjacent rays, the decoupling of the initial ray tracing and the lighting calculations is crucial. Therefore, in a preferred embodiment the two-dimensional image calculator is configured to only define the segments and collect the relevant data for the later lighting calculations during initial ray tracing. For every segment, in an embodiment this data is comprised of the start position of the segment inside the volume, the current accumulated color and the alpha-blended accumulated opacity. In another embodiment just the locations are stored, at which the lighting values should be calculated, i.e. in another embodiment just the lighting value determination locations are stored. These values can be stored in one-dimensional arrays with one element per segment. Since it is also possible that a ray does not reach the full opacity and therefore not all segments are used, the two-dimensional image calculator preferentially also comprises an additional counter that counts the number of valid segments for the later lighting computation step.

The two-dimensional image calculator can be configured to, after the ray tracing, calculate the final color value for the current pixel by iterating over the number of valid segments, multiplying the stored color value of each segment with the computed lighting approximation, i.e. with the calculated lighting value and the calculated AO value, and adding them together, in accordance with above equation (8).

As described above, the two-dimensional image calculator is configured to compute AO similar to the Voxel Cone Tracing algorithm as disclosed by the above mentioned article by Crassin et al., but adapted to DVR. Similar to the article by Crassin et al., the two-dimensional image calculator therefore uses volumes in multiple levels of detail and resolutions, but the two-dimensional image calculator does not structurize it using an octree or another hierarchical data structure. The creation of the LOD representation is therefore simple. An OpenGL-based implementation might for example employ the built-in LOD functionality of OpenGL during the creation of the 3D texture of the volume. The inventors, however, found that the later sampling of the LOD levels of the volume is faster when the down sampling is performed manually and each LOD level is stored in a separate sampler. Moreover, it has been found that, depending on the size and complexity of the underlying data, a small amount of LOD levels like four or seven is already sufficient. It is also feasible to automatically compute the number of LOD levels based on the size of the three-dimensional image. Moreover, the two-dimensional image calculator is preferentially configured to create the LOD levels in a similar fashion to the technique disclosed in the above mentioned article by Crassin et al. by using the rasterization pipeline. More precisely, the two-dimensional image calculator 2 is preferentially configured to employ a volume renderer which renders the volume slice by slice in a frame buffer object (FBO), to gain a separate occlusion volume. By using another volume renderer instance to bake the occlusion volume, also very complex datasets with multiple secondary volumes, clipping planes, additional TFs et cetera can be covered. Because lighting or shading are not computed for the occlusion volume, this additional rendering step is very fast and can be easily performed on the fly when the TF is being changed by the user. The generation of this multi-resolution volume can then be executed efficiently on the GPU of the two-dimensional image calculator 2 via a GLSL shader that performs an under sampling of the former LOD level and thereby creates the next LOD level with exact half of the size of the former level in every dimension. Every LOD level can be stored in a one-channel 16 bit texture like a R16 texture or even in a RGBA16 texture to allow for colored shadows. Each LOD level can then be bound to the main shader as a separate sampler.

Moreover, the interpolation can be efficiently done by exploiting, for instance, the OpenGL hardware filtering when sampling the higher level volumes between two slices. Preferentially, a 3×3 Gaussian filter kernel is additionally applied during the down sampling, similar to Crassin et al., to ensure smooth results. These steps are repeated until the desired number of LOD levels in the multi-resolution volume is created or the volume cannot be further reduced. The two-dimensional image calculator recomputes the LOD levels once the TF is changed to account for fully dynamic changes of the TF. This also significantly simplifies the algorithm since a dynamic update scheme or similar mechanisms are not needed.

The two-dimensional image calculator is preferentially configured to calculate two two-dimensional images in different viewing directions, in order to allow for stereo view.

The two-dimensional image calculator facilitates advanced illumination effects in high frame rate DVR by combining a new sampling scheme with Voxel Cone Tracing. The sampling scheme reduces the amount of illumination computations along the primary viewing ray while the Voxel Cone Tracing reduces the complexity of the illumination computation itself. This combination even allows for the definition of TFs or clipping planes in real-time without any loss of image quality.

In the described embodiments, the two-dimensional image calculator combines the adaptive illumination sampling with image-based lighting, AO, and direct illumination with the shadow casting technique. However, other illumination techniques such as subsurface scattering could be used as well.

The input device 3 of the DVR apparatus 1 is preferentially configured to allow the user to modify a) the TF and/or b) a position and/or orientation of one or more clipping planes and/or c) a position and/or orientation of the virtual camera. Correspondingly, the two-dimensional image calculator 2 is preferentially configured to compute AO in DVR while enabling fully interactive TF and/or clipping plane and/or virtual camera changes in real-time. At the core of the corresponding algorithm, the two-dimensional image calculator 2 employs an adaptive sampling scheme that splits the rays into segments, which facilitate the required reduction of the amount of illumination computations along the viewing ray, i.e. along the primary ray. The illumination computation itself is computed efficiently using an adaption of Voxel Cone Tracing. This requires a minimal precomputation and allows for noise-free on-the-fly computation of AO in combination with image-based lighting and soft shadows for an almost arbitrary number of directional or point lights.

The two-dimensional image calculator can easily be produced by integrating the described algorithm into existing ray-casting-based volume rendering pipelines. For the primary target use case, which is AR, the two-dimensional image calculator represents a suitable compromise with the combination of high frame rates with noise-free, realistically illuminated images. It lends itself especially to a combination with image-based lighting, which could facilitate a deeper integration of the rendered image with the real environment.

The concept of segment-based ray-casting implemented in the two-dimensional image calculator can be used for all scenarios where repetitive calculations along a ray have to be reduced. The segment-based rendering can therefore be used in many domains and algorithms like global illumination algorithms. Further, the above described lighting term could be extended to include more sophisticated effects or shading models that cover for instance colored shadows, Subsurface Scattering or even full Global Illumination.

The AO computation carried out by the two-dimensional image calculator could be named "Adaptive Volumetric Illumination Sampling" and abbreviated AVIS and is preferentially a fully GPU-based real-time technique for computing AO in ray-casting based DVR. It allows to compute AO for DVR in real-time while supporting both interactive TF updates and clipping of the visualized data at high frame rates and resolutions. To this end, the proposed technique combines cone-traced AO with an adaptive sampling scheme that facilitates the reduction of the computational efforts and produces noise-free AO with only minimal precomputation. The described technique can be integrated into an existing production volume rendering pipeline and is preferentially utilized in the context of medical volume rendering in an AR setting. Preferentially, it is designed for medical application scenarios and works well even for complex datasets.

The idea to use obscurance—or occlusion—as a means to approximate indirect illumination was originally proposed in the above mentioned article by S. Zhukov et al. Their method, which is now known as Ambient Occlusion, uses the computed amount of occlusion at a certain surface point to modulate ambient light coming from a distributed pseudo light source. Typically, AO is computed by means of ray casting: Multiple rays are traced to sample a hemisphere. For each ray the amount of occlusion is computed and the occlusion value of the surface point is the average of all occlusion values.

Although AO is only an approximation of global illumination, it is still computationally expensive. One solution to enable real-time rendering of AO is to precompute the AO value or the bent normal and store them in textures or three-dimensional grids. However, this allows for rigid transformations only.

Fully dynamic AO is realized on current graphics hardware as a 2.5D image space process, so called screen space ambient occlusion (SSAO). It is based on operations on deferred shading buffers for the depth and surface normal, but only popular in surface-based rendering.

The work on realistic illumination models initially focused on surface rendering but eventually spawned similar works in the field of DVR. Besides shadow casting approaches as described in the articles "Adding shadows to a texture-based volume renderer" by U. Behrens et al., IEEE Symposium on Volume Visualization (2002), "GPU-Accelerated deep shadow maps for direct volume rendering" by M. Hadwiger et al., Graphics Hardware, pages 49 to 52 (2006), and "Efficient shadows for GPU-based volume ray-casting" by T. Ropinski et al., International Conference in Central Europe on Computer Graphics, Visualization and Computer Vision (2008), which are herewith incorporated by reference, application of the ambient occlusion methodology to volume rendering gained a lot of interest. One of the first approaches for AO for DVR was "Vicinity Shading" as described in the article "Vicinity shading for enhanced perception of volumetric data" by A. Stewart, Proceedings of the IEEE visualization conference, pages 355 to 362 (2003), which is also herewith incorporated by reference. In this article, local illumination is computed by investigating the obscurance of neighboring voxels, but preprocessing was required for every modification on the scene and an additional buffer to store the results.

In the article "Local ambient occlusion in direct volume rendering" by F. Hernell et al., IEEE Transactions on Visualization and Computer Graphics, 16(4), pages 548 to 559 (2010), which is also herewith incorporated by reference, local AO is described, which computes occlusion from the local neighborhood by firstly down-sampling and packing the volume into blocks with multiple resolutions in a pre-computation step. The AO is then stored in an additional ambient light texture which is getting progressively updated with one AO sample direction per frame and a regular geometric pattern determining the ray directions. The sampling along the primary and the secondary rays follows an adaptive scheme, where the step length is based on the resolution of the underlying block. This enables an efficient LOD-based traversal and sampling of the volume while skipping empty space. Although this approach produces plausible results, allows clipping of the data and does not rely on gradients, it suffers from discontinuity artefacts and is too slow for real-time applications, especially since the underlying multi-resolution volume has to be recomputed for every change of the TF.

In a similar manner, in the article "Interactive volumetric lighting simulating scattering and shadowing" by T. Ropinski et al., IEEE pacific visualization symposium, pages 169 to 176 (2010), which is also herewith incorporated by reference, an illumination volume is generated with front-to-back accumulation of the chromaticity of the volume and in a second pass scattering the light in back-to-front order using cones for both the light transportation and scattering. With an appropriate shading model, this yields scattering and diffuse, specular and semi-transparent materials while the volume can be recomputed on the fly when the transfer function or light position changes. However, the limitation of having only one dynamic point or directional light source is quite restrictive.

A concept of reducing the required samples by splitting rays into pieces has been investigated in the article "Interactive global light propagation in direct volume rendering using local piecewise integration" by F. Hernell et al., SPBG'08 Proceedings of the Fifth Eurographics/IEEE VGTC Conference on Point-Based Graphics, pages 105 to 112 (2008), which is also incorporated by reference, wherein in this article a piecewise integration is provided. In contrast to the approach used by the two-dimensional image generation unit 2, in this article the segments are of uniform size and not opacity-driven, however. Further, in this article piecewise integration is employed only to light rays (or secondary rays) during creation of a multi-resolution LOD-based shadow volume and not to the primary rays. Using the resulting shadow volume, in this article local first order scattering effects are then computed, with a method similar to local ambient occlusion described in "Efficient ambient and emissive tissue illumination using local occlusion in multiresolution volume rendering" by F. Hernell et al., Proceedings of Eurographics/IEEE Volume Graphics 2007, pages 1 to 8 (2007) which is also herewith incorporated by reference. In the last step, a single ray-casting pass is used to render the final image. Although this approach allows for interactive changes of the TF, clipping planes are not supported. Regarding the lighting, this method does not support environment maps and only up to four point lights.

In the article "Historygrams: Enabling interactive global illumination in direct volume rendering using photon mapping" by D. Jonsson et al., IEEE transactions on visualization and computer graphics, volume 18, pages 2364 to 2371 (2012), which is also herewith incorporated by reference, the idea of splitting rays into segments/parts is advanced, in order to create an adaptive update scheme for a photon mapping approach for volume rendering. For each primary ray and each ray from a light source, the ray is being split into segments wherever an interaction (scattering, absorption, etc.) of the photon with the medium occurs. Since every ray stores a history of the used parameters when the segment was last updated, only the affected segments are recomputed when the TF is changed by the user. Similarly, every photon stores a complete history of the light path. In this article they are called "historygrams" and stored one per object. Also, the segments of the primary ray are sized uniformly and not opacity-dependent. Furthermore, this approach is not feasible in real-time and constantly changing camera and light positions as they occur in AR scenarios are problematic in particular since the photon updates are very costly.

In the article "Exposure render: An interactive photo-realistic volume rendering framework" by T. Kroes et al., PLoS ONE, 7(7), https://doi.org/10.1371/journal.pone.0038586 (2012), which is also herewith incorporated by reference, the feasibility of full dynamic global illumination in DVR based on path tracing is demonstrated. The technique was adapted by Siemens Healthineers and christened as Cinematic Rendering. Typically, path tracing, being an iterative algorithm, converges to a result with low noise within a couple of seconds. However, convergence to a smooth result can only be achieved by taking a higher number of samples from the same view. Although the process can be fastened, e.g. by using a denoising filter, path tracing is still too slow for applications with high demands on exactness and speed, like in the medical context and AR scenarios. However, path tracing still produces the most accurate results as it is physically the most correct method.

In the article "Adaptive Temporal Sampling for Volumetric Path Tracing of Medical Data". Computer Graphics Forum, 38(4), pages 67 to 76 (2019), which is herewith incorporated by reference, a way to make path tracing feasible for virtual and AR scenarios is illustrated. In the described approach, temporal reprojection, as known from surface-based rendering, was applied to path-traced volume rendering by storing additional information in the screen-space history buffer and by employing adaptive sampling techniques. This enables to reuse already computed values and spend samples only where necessary. Even though this improves the performance of path-traced volume rendering, the resulting images are still suffering from noise and blurriness, which particularly in medical volume renderings is unfavorable. In addition to that, changes of the TF and clipping planes are just indirectly and to a certain extent supported.

In the above mentioned article by Crassin et al. the "Voxel Cone Tracing" technique is proposed, a technique for classical surface rendering that enables smooth and noise-free global illumination in good quality and in real-time. The fully GPU-based approach works almost without precomputation, except of the need to voxelize the scene and store the information in a hierarchical octree structure, called "Sparse Voxel Octree" that contains the scene in different LODs. The basic algorithm then comprises three basic steps: First, the scene is rendered from the light positions to distribute the incident light information into the octree, second the light is propagated through the volume, yielding the radiance for each octree node, and third the scene is rendered again from the camera's point of view and for each visible surface point, wherein a final gathering using Cone Tracing is performed as described in the article "Ray Tracing With Cones" by J. Amanatides, Computer Graphics (ACM), 18(3), pages 129 to 135 (1984), which is also herewith incorporated by reference. A separate cone for the specular part of the bidirectional reflectance distribution function (BRDF) allows for specular materials. In this article by Crassin et al. also an example is given on how to use the Cone Tracing for computing AO.

In the following an embodiment of a DVR method for volume rendering a three-dimensional image data set will exemplarily be described with reference to a flow chart shown in FIG. 6.

In step 101 a three-dimensional image data set is provided, which is preferentially a medical image data set like a CT or MR image data set. In step 102 to each voxel of the three-dimensional image a color and an opacity are assigned, and in step 103 for each primary ray of a plurality of primary rays, which traverse the three-dimensional image data and meet a respective pixel of a two-dimensional image in a two-dimensional image plane on which the three-dimensional image data set should be projected, colors and opacities are calculated along the primary ray based on the colors and opacities assigned to voxels traversed by the primary ray. In step 104 each primary ray is subdivided into segments based on the opacities along the respective primary ray, and in step 105 for each segment a segment lighting value is calculated in accordance with a predetermined lighting calculation rule. In step 106 the colors and segment lighting values are projected along the primary rays onto the pixels based on the predetermined projection rule, in order to generate the two-dimensional image. It is also possible that steps 103 and 104 are integrated, i.e. that already during an initial ray casting the opacities and colors along the primary rays are calculated and the segments are determined. In particular, in a preferred embodiment during initial ray casting the opacities and colors along the primary rays are calculated, the segments are determined and also the position within the respective segment, for which a segment lighting value should be calculated, is determined. Thus, already during initial ray casting the lighting value determination positions can be determined.

In step 107 it is checked whether the assigning of the colors and the opacities to the voxels, i.e. a corresponding transfer function, has been amended by the user by using the input device 3. If this is the case, the method proceeds with step 103. Moreover, in step 107 it is also checked whether the user has modified a clipping plane by using the user device 3 or a position and/or orientation of a virtual camera. Also in this case the method can proceed with step 103. Moreover, in step 107 it is checked whether the user has indicated via the input device 3 that the DVR method should be stopped. If this is the case, the method ends in step 108.

Thus, the user can modify the TF, a clipping plane and/or the position of the virtual camera, wherein the generated two-dimensional image is continuously updated such that the user can see how the modifications influence the visualization in real-time.

In an embodiment the lighting value calculation for one sample point, i.e. for a light value determination position, on a determined segment is given as a summation of an (1) ambient light term and an arbitrary number of (2) directional light terms, as it will be described in the following.

(1) The ambient light term is computed as the light incoming from all directions over the hemisphere of the sample point. To this end, an environment map is used to specify the light coming from all directions in the form of a 360° by 180° panorama. This light is modulated by shadowing as calculated by means of ambient occlusion in accordance with the calculation disclosed in the above mentioned article by Zhukov et al. More precisely, voxel cone tracing as described in the above mentioned article by Crassin et al. is used to compute the ambient occlusion. This means, the hemisphere is sampled by a small number (typically 5 or 6) of cones which are evenly distributed such that the hemisphere is more or less covered by the resulting circles on its surface. A minimal overlap is allowed. Preferentially, six cones with an opening angle of 67° are used. These cones are defined in a fixed reference frame which is oriented with the gradient of the three-dimensional image data set at the sample point. Each cone is traced through the three-dimensional image data set to compute the occlusion resulting from the parts of the volume that are covered by this cone. The following description is for one of these cones: The tracing of a cone is implemented by sampling an additional level of detail (LOD) occlusion volume which has been pre-computed based on the original three-dimensional image data set and the TF. The idea behind this is that starting from the apex of the cone and following the cone along its main axis, the cross section of the cone grows. Instead of sampling the original three-dimensional image data set at many points inside the whole volume of the cone to compute a representative occlusion value, a few spheres, i.e. spherical areas, on the axis of the cone are sampled, each sphere with a larger radius than the sphere before. It is preferred, however, that the radii of the sampling spheres always exactly double as the voxels of each LOD level are always doubling their size as well. Because they should also match the current radius of the cone, the sampling points along the ray are automatically determined. Sampling these spheres is implemented by fetching values from the additional LOD occlusion volume. The voxel sizes of the levels grow: Each level is doubling the voxel size with respect to the previous level. Hence, fetching a value from a lower resolution level means acquiring the integration of samples in a larger area, i.e. acquiring the occlusion of a larger area. This is used to compute the occlusion values for each sphere in the cone with just one sample. The combination of a few sphere occlusion values yields the occlusion value for the whole cone. The number of spheres (or steps along the ray) depends on the size of the neighborhood that should be considered for the occlusion computation and the size of the three-dimensional data set. In any case, spheres may only be considered until the cone axis leaves the three-dimensional image data or penetrates a clipping plane. The occlusion value is used to modulate the light from the environment map that would reach the sample point along directions that pass through this cone. Fetching this light from the environment map would again require taking multiple samples from that map. Instead, pre-convolved lighting as described in the above mentioned article by Klehm at al. is used. Similar to the LOD occlusion volume an additional representation of the environment map is used which pre-integrates the light that would fall in through a cone with the given opening angle, i.e. with the given aperture. Hence, only one sample has to be taken from the panorama at the position that corresponds to the direction of the cone. The sample value is modulated with the occlusion value of that cone to yield the amount of incoming ambient light for the solid angle covered by that cone. By repeating that process for all cones, and by computing the weighted sum of the results, wherein the weighting factor depends on the inclination of each cone to the respective gradient, the ambient light for the whole hemisphere, i.e. the modulated first incoming light, is computed. In particular, the weighting factor can be given by the cosine of the inclination of the respective cone to the gradient.

(2) A directional light term for a given light source is computed based on a common local illumination model, e.g. the Phong model and a respective shadow value. The shadow value is approximated by reusing the occlusion values that were computed for the six cones (see (1)). Hence, the shadow value for a light source is a weighted sum of the cone occlusion values where the weight depends on the angle between the light direction and the cone axis as well as the cone opening angle. This shadow value is used to modulate the result of the local illumination model. This process is repeated for all light sources.

The DVR apparatus and method preferentially use ambient occlusion instead of global illumination, in order to increase the update velocity, i.e. the achievable frame rate.

Although in above described embodiments the image data set is a medical image data set, in other embodiments the image data set can also be another kind of data set like an image data set used in the field of material science, flow visualization, et cetera.

Although in above described embodiments a transfer function has been used for assigning the opacities and colors to the voxels, in other embodiments opacities and colors might be provided without using a transfer function. For instance, the voxels or other types of image elements might already comprise opacities and colors, wherein the opacities and colors on the primary rays are determined by, for instance, interpolation based on the opacities and colors of the image elements.

Although in above described embodiments each primary ray is subdivided into segments based on the opacities along the respective primary ray, particularly based on accumulated opacities, alternatively or in addition this subdivision can also be carried out based on the colors along the respective primary ray. For instance, the respective color at a respective location along the respective primary ray, which typically comprises three numerical values for the components red, green and blue, can be mapped to one numerical value. This can be achieved, for example, by computing the average of the three numerical values or by computing a weighted sum which allows for consideration of human color perception like $Y=0.2125*R+0.7154*G+0.0721*B$, wherein Y is the one numerical value to which the three numerical values should be mapped and R, G, and B are the three numerical values for the components red, green and blue, as disclosed in, for instance, the article "Rehabilitation of gamma" by Charles A. Poynton, Photonics West'98 Electronic Imaging, International Society for Optics and Photonics (1998), which is herewith incorporated by reference. The detection of the segment borders then can be carried out based on the numerical values which have been obtained by the mapping and which therefore represent the respective colors along the respective primary ray. A mathematical function is applied to the obtained numerical values representing the colors and the result can be compared with the threshold values, in order to determine the segment borders, particularly as described above with respect to the accumulated opacities. Also, if the original opacities should be used for determining the segment borders, a mathematical function is applied to the obtained numerical values, which in this case represent the original opacities, and the result can be compared with the threshold values, in order to determine the segment borders, particularly as described above with respect to the accumulated opacities. In an embodiment the mathematical function is an integral function, i.e. an integral, wherein the values representing the colors or original opacities are summed up along the respective primary ray and wherein a respective segment border is defined by the sum exceeding a respective threshold. Thresholds providing a very high speed of the entire DVR procedure can be determined by calibration, wherein during a calibration procedure the thresholds are determined such that the speed of the DVR procedure is increased, particularly maximized.

The mathematical function can also be another function like a derivative of the opacities, of the colors or of the accumulated opacities. The derivative is particularly useful for detecting strong changes which typically correspond to tissue borders, wherein the segment borders can be arranged at the positions of these strong changes. Thus, the segment borders can be determined by thresholding the derivative, wherein the derivative defines how much the respective parameter (color, opacity or accumulated opacity) changes along the respective primary ray. The derivative can be determined based on differences between subsequent values along the primary ray.

Although an above described embodiment includes a computation of the segment lighting value based on a specific version of ambient occlusion (Voxel Cone Tracing) and an approximation of directional lights (parallel lights and point lights) also based on Voxel Cone Tracing, the segment lighting value could also be determined in another way. For instance, any method for the computation of light and shadowing for a given position could be used instead. Each alternative method would benefit from the reduced number of computations. As an example, the established Deep Shadow Maps method described in the above mentioned article by M. Hadwiger could be used. Instead of sampling the shadow map for each point along the ray, it would be required only to sample once per segment which would speed up rendering.

Although it has been described that it is only required to calculate one lighting value per segment, it is also possible that more than one lighting value is calculated per segment, wherein still not for all sampling positions along the respective primary ray, i.e. not for all positions to which colors and opacities have been assigned, lighting values are determined. For instance, for less than 50 percent, further preferred for less than 30 percent and even further preferred for less than 20 percent of the sampling positions within a respective segment a lighting value, i.e. a segment lighting value, is determined. Alternatively, a fixed number of lighting values per segment could be used, which would allow to limit the number of lighting value computations even more efficiently. Thus, instead of defining one lighting value determination position, multiple lighting value determination positions could be used in one segment to increase the accuracy of the method, wherein still the reduction of the computational efforts needed for calculating the two-dimensional image would be significant. For example, lighting value determination positions could be defined within each quarter of a respective segment. For multiple lighting value determination positions multiple lighting values can be computed following the predetermined lighting value calculation rule. These could be combined into one segment lighting value (e.g. by computing the average), or could be used for the quarter alone, if for each quarter a segment lighting value is determined. Also, the segment lighting values could be interpolated between the lighting value determination positions. That way, a lighting value for each sample on the primary ray could be approximated.

Although in an above described embodiment a projection rule is described, which includes multiplying the segment lighting value with the segment color, also other projection rules could be used. For instance, the segment lighting value could be multiplied with one, several or all colors along the respective primary ray and within the respective segment, wherein the resulting products can be summed up. Thus, in this alternative implementation the segment lighting value is reused for, for example, all samples in the respective segment. In accordance with a further projection rule, the segment lighting values are interpolated between the segment lighting positions such that for a respective sample position and hence for a respective color a respective interpolated lighting value is determined, wherein a respective color is multiplied with a respective interpolated lighting value at a respective position along the primary ray, i.e. at a respective sampling position, and wherein the resulting products are summed up. Generally, the term "projecting the colors and segment lighting values along the primary rays onto the pixels" refers to the procedure of combining the colors and the segment lighting values along a respective primary ray such that for the respective primary ray a respective pixel value is determined, wherein this combining can include a pre-processing of the color and segment lighting values like the above described interpolation and also a post-processing of the pixel values.

It is possible that one primary ray is traced for one pixel, or that multiple primary rays are traced for one pixel in order to reduce aliasing artifacts. In the latter case, the described method is carried out multiple times for a limited number of positions within the area of the corresponding pixel instead of carrying it out once for a single position which is preferentially at the center of the corresponding pixel.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the determining of opacities and colors for the primary rays, subdividing the primary rays into segments, calculating segment lighting values, projecting the colors and the segment lighting values, et cetera performed by the two-dimensional image calculator could also be performed by any other number of units or devices. These procedures and/or the control of the DVR apparatus in accordance with the DVR method can be implemented as program code means of a computer program and/as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a direct volume rendering apparatus for volume rendering a three-dimensional image data set. For each primary ray of a plurality of primary rays, which traverse through the three-dimensional image data set and meet a respective pixel of a two-dimensional image in a two-dimensional image plane on which the three-dimensional image data set should be projected, colors and opacities are provided along the primary ray. Each primary ray is subdivided into segments based on the opacities and/or colors along the respective primary ray, wherein, for each segment, a segment lighting value in accordance with a predetermined lighting calculation rule is calculated. The colors and segment lighting values are finally projected along the primary rays onto the pixels based on a predetermined projection rule.

We claim:

1. A direct volume rendering apparatus for volume rendering a three-dimensional image data set, wherein the direct volume rendering apparatus comprises a two-dimensional image calculator configured to calculate a two-dimensional image to be shown to a user by:

providing for each primary ray of a plurality of primary rays, which traverse through the three-dimensional image data set and meet a respective pixel of a two-dimensional image in a two-dimensional image plane on which the three-dimensional image data set should be projected, colors and opacities along the primary ray;

subdividing each primary ray into segments based on the opacities and/or colors along the respective primary ray;

calculating, for each segment, a segment lighting value in accordance with a predetermined lighting calculation rule, by a) defining a lighting value position within the respective segment and b) calculating, for the respective lighting value deamination position, the respective segment lighting value in accordance with the predetermined lighting calculation rule; and projecting the colors and segment lighting values along the primary rays onto the pixels based on a predetermined projection rule.

2. The direct volume rendering apparatus as defined by claim 1, wherein the three-dimensional image data set comprises image elements, wherein the two-dimensional image calculator is configured to provide for each primary ray colors and opacities along the respective primary ray by:

assigning to each image element of the three-dimensional image data set a color and an opacity; and calculating for each primary ray colors and opacities along the primary ray based on the colors and opacities assigned to image elements traversed by the primary ray.

3. The direct volume rendering apparatus of claim 2, wherein the predetermined lighting value calculation rule includes calculating a) the ambient lighting value by providing an environment map defining in which direction first incoming light has which intensity and modifying the intensity of the first in-coming light based on the opacities assigned to the image elements, and b) the at least one directional lighting value by providing directional lighting information for a lighting value determination position, which is indicative of the light intensity of second incoming light from a virtual light source, and modifying the intensity of the second incoming light based on the opacities assigned to the image elements.

4. The direct volume rendering apparatus of claim 3, wherein the ambient lighting value is calculated by:

defining several cones within a hemisphere for the lighting value determination position, wherein the hemisphere is defined by a gradient of the colors and/or opacities assigned to the image elements at the lighting value determination position, wherein the hemisphere points in the direction of the gradient and an end plane of the hemisphere traverses the lighting value determination position and is normal to the gradient, wherein the apices of the cones are located at the lighting value determination position;

defining, for each cone, spheres centered on the axis of the respective cone, wherein the radii of the spheres increase with increasing distance to the respective apex;

determining an occlusion value for each sphere and combining the occlusion values determined for all spheres of the respective cone, in order to determine an occlusion value for the entire cone;

determining, for each cone, a modified light intensity based on the occlusion value determined for the respective cone and the light intensity of the light incoming through the respective cone as defined by the environment map; and combining the modified light intensities determined for the cones of the respective lighting value determination position, in order to determine for the respective lighting value determination position an ambient lighting value.

5. The direct volume rendering apparatus of claim 1, wherein the two-dimensional image calculator is configured to subdivide each primary ray into segments by defining segment borders, wherein a segment border is defined by a position along a primary ray at which a function of the opacities and/or color exceeds a predefined threshold value.

6. The direct volume rendering apparatus of claim 5, wherein the function of the opacities is a function selected from the group consisting of:
the identity function, a linear function, an integrating function and a derivating function, directly applied to the opacities and/or colors and/or applied to accumulated opacities.

7. The direct volume rendering apparatus of claim 5, wherein the two-dimensional image calculator is configured to provide several threshold values, wherein a segment border is defined by a position along a primary ray at which a function of the opacities and/or colors exceeds a predefined threshold value of the provided several threshold values.

8. The direct volume rendering apparatus of claim 7, wherein the difference between neighboring provided thresholds is constant.

9. The direct volume rendering apparatus of claim 7, wherein the two-dimensional image calculator is configured to provide the several threshold values in accordance with a predefined linear threshold function or an exponential threshold function.

10. The direct volume rendering apparatus of claim 1, wherein the two-dimensional image calculator is configured to define the lighting value determination position within the respective segment such that it is within a quarter of the respective segment, which is arranged at the end of each segment with the primary ray being traced from the pixel position towards the volume.

11. The direct volume rendering apparatus of claim 1, wherein the predetermined lighting value calculation rule includes at least one of a) calculating an ambient lighting value and b) calculating at least one directional lighting value.

12. The direct volume rendering apparatus of claim 1, wherein the two-dimensional image calculator is further configured to calculate for each segment a segment color based on the colors and opacities along the respective segment and to project the colors and segment lighting values along the primary rays onto the pixels by projecting the segment colors and segment lighting values.

13. A computer-implemented direct volume rendering method in a direct volume rendering apparatus for volume rendering a three-dimensional image data set, wherein the direct volume rendering method comprises:
providing for each primary ray of a plurality of primary rays, which traverse through the three-dimensional image data set and meet a respective pixel of a two-dimensional image in a two-dimensional image plane on which the three-dimensional image data set should be projected, colors and opacities along the primary ray;

subdividing each primary ray into segments based on the opacities and/or colors along the respective primary ray;

calculating, for each segment, a segment lighting value in accordance with a predetermined lighting calculation rule, by a) defining a lighting value deamination position within the respective segment and b) calculating, for the respective lighting value deamination position, the respective segment lighting value in accordance with the predetermined lighting value calculation rule; and projecting the colors and segment lighting values along the primary rays onto the pixels based on a predetermined projection rule.

14. A computer readable memory medium storing program code instructions for controlling a computer processor of a direct volume rendering apparatus, when executed, to cause volume rendering of a three-dimensional image data set, by performing a method comprising:
providing for each primary ray of a plurality of primary rays, which traverse through the three-dimensional image data set and meet a respective pixel of a two-dimensional image in a two-dimensional image plane on which the three-dimensional image data set should be projected, colors and opacities along the primary ray;

subdividing each primary ray into segments based on the opacities and/or colors along the respective primary ray;

calculating, for each segment, a segment lighting value in accordance with a predetermined lighting calculation rule, by a) defining a lighting value deamination position within the respective segment and b) calculating, for the respective lighting value deamination position, the respective segment lighting value in accordance with the predetermined lighting value calculation rule; and projecting the colors and segment lighting values along the primary rays onto the pixels based on a predetermined projection rule.

* * * * *